United States Patent
Babcock et al.

(10) Patent No.: US 10,577,533 B2
(45) Date of Patent: *Mar. 3, 2020

(54) UNCONVENTIONAL ENHANCED OIL RECOVERY

(71) Applicants: Linde Aktiengesellschaft, Munich OT (DE); John A. Babcock, Houston, TX (US)

(72) Inventors: John A. Babcock, Houston, TX (US); Charles P. Siess, III, Conroe, TX (US); Kevin G. Watts, Spring, TX (US); Roberta Watts, Smithville, TX (US)

(73) Assignee: Linde Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,244

(22) Filed: Mar. 20, 2017

(65) Prior Publication Data

US 2018/0057732 A1 Mar. 1, 2018

Related U.S. Application Data

(60) Provisional application No. 62/380,446, filed on Aug. 28, 2016.

(51) Int. Cl.
| | |
|---|---|
| *E21B 43/16* | (2006.01) |
| *C09K 8/594* | (2006.01) |

(Continued)

(52) U.S. Cl.
CPC ............... *C09K 8/594* (2013.01); *C09K 8/34* (2013.01); *C09K 8/58* (2013.01); *C09K 8/584* (2013.01); *C09K 8/588* (2013.01); *C10L 3/06* (2013.01); *E21B 43/16* (2013.01); *E21B 43/162* (2013.01); *E21B 43/166* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 3,035,637 A | 5/1962 | Allen | |
| 3,118,499 A * | 1/1964 | Johnson | E21B 43/16 166/269 |

(Continued)

FOREIGN PATENT DOCUMENTS

| | | |
|---|---|---|
| DE | 102014010105 A1 | 1/2016 |
| FR | 2466606 A1 | 4/1981 |

(Continued)

OTHER PUBLICATIONS

Petropedia, "Pentane Plus," retrieved May 7, 2018 from https://www.petropedia.com/definition/8212/pentane-plus (Year: 2018).*

(Continued)

*Primary Examiner* — Angela M DiTrani Leff
(74) *Attorney, Agent, or Firm* — Patterson + Sheridan, LLP

(57) ABSTRACT

A method of enhanced oil recovery from an unconventional resource reservoir comprises injecting an enhanced recovery fluid into the unconventional resource reservoir via an injection well and producing hydrocarbons from the unconventional resource reservoir via the injection well or a production well offset from the injection well.

39 Claims, 14 Drawing Sheets

(51) Int. Cl.
*C09K 8/584* (2006.01)
*C09K 8/588* (2006.01)
*C09K 8/58* (2006.01)
*C09K 8/34* (2006.01)
*C10L 3/06* (2006.01)

(56) References Cited

U.S. PATENT DOCUMENTS

| | | | |
|---|---|---|---|
| 3,316,965 | A | 5/1967 | Watanabe |
| 3,319,712 | A | 5/1967 | O'Brien |
| 3,358,756 | A * | 12/1967 | Vogel .................. E21B 43/2405 166/266 |
| 3,368,627 | A | 2/1968 | Hurst et al. |
| 3,954,141 | A * | 5/1976 | Allen ....................... C10G 1/04 166/403 |
| 4,490,985 | A | 1/1985 | Wells |
| 4,511,381 | A | 4/1985 | Mehra |
| 6,230,814 | B1 | 5/2001 | Nasr et al. |
| 7,373,790 | B2 | 5/2008 | Clare et al. |
| 8,505,332 | B1 | 8/2013 | Prim |
| 8,844,639 | B2 | 9/2014 | Gupta et al. |
| 9,488,040 | B2 | 11/2016 | Chakrabarty et al. |
| 9,534,836 | B2 | 1/2017 | Dubettier-Grenier et al. |
| 2005/0189112 | A1 | 9/2005 | Taylor et al. |
| 2006/0289166 | A1 | 12/2006 | Stromquist et al. |
| 2007/0000666 | A1 | 1/2007 | Vozniak et al. |
| 2007/0187340 | A1 | 8/2007 | Oresti et al. |
| 2008/0087041 | A1 | 4/2008 | Denton et al. |
| 2012/0000660 | A1 | 1/2012 | Gatlin et al. |
| 2012/0047942 | A1 | 3/2012 | Kolodziej |
| 2013/0168086 | A1 | 7/2013 | Roberts |
| 2013/0199774 | A1 * | 8/2013 | Sultenfuss ............ E21B 43/164 166/248 |
| 2013/0220605 | A1 | 8/2013 | Vandor |
| 2013/0299167 | A1 | 11/2013 | Fordyce et al. |
| 2014/0000899 | A1 | 1/2014 | Nevison |
| 2014/0124208 | A1 | 5/2014 | Loree et al. |
| 2014/0366577 | A1 | 12/2014 | Zubrin et al. |
| 2015/0021022 | A1 | 1/2015 | Ladva et al. |
| 2015/0152318 | A1 | 6/2015 | Travis |
| 2015/0167550 | A1 | 6/2015 | Vandervort et al. |
| 2015/0184932 | A1 | 7/2015 | Higginbotham et al. |
| 2015/0233222 | A1 | 8/2015 | Teklu et al. |
| 2015/0368566 | A1 | 12/2015 | Young et al. |
| 2016/0122628 | A1 * | 5/2016 | Babcock .................. C09K 8/80 166/305.1 |
| 2016/0369611 | A1 * | 12/2016 | Bragg ..................... E21B 43/40 |
| 2017/0283688 | A1 * | 10/2017 | Valencia ................ C09K 8/594 |

FOREIGN PATENT DOCUMENTS

| | | |
|---|---|---|
| GB | 2219818 A | 12/1989 |
| WO | 2010025540 A1 | 3/2010 |
| WO | 2012097424 A1 | 7/2012 |
| WO | 2015020654 A1 | 2/2015 |
| WO | 2016064645 A1 | 4/2016 |

OTHER PUBLICATIONS

M. Asadi et al., "Water-Free Fracturing: A Case History", Society of Petroleum Engineers, SPE-175988-MS, 14 Pages.

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1,5; table 2, Jan. 1, 1992.

Holtz et al., "Summary Integrated Geologic and Engineering Determination of Oil- Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Qing Sun et al., "Quantification of uncertainty in recovery efficiency predictions: lessons learned from 250 mature carbonate fields", SPE 84459, pp. 1-15, Jan. 1, 2005.

Rassenfoss; "In Search of the waterless fracture", JPT, Jun. 30, 2013, pp. 46-54, XP055237780.

* cited by examiner

UNCONVENTIONAL ENHANCED OIL RECOVERY

BACKGROUND

Field

Embodiments of the disclosure relate to enhanced oil recovery techniques in unconventional resource plays.

Description of the Related Art

Unconventional resource plays are ushering in a new era for oil and gas production. The term "resource play" refers to a relatively large hydrocarbon play located over a broad geographical area. In a resource play, the geological likelihood of encountering a hydrocarbon generation window having a conventional hydrocarbon bearing reservoir, a seal (or other type of trapping mechanism) to contain the hydrocarbons in the reservoir, and an organic rich source rock from which the hydrocarbons are generated is nearly certain. Resource plays have been described as statistical plays in which an operator can expect fairly repeatable results if enough wells are drilled. The term "unconventional" refers to hydrocarbons that have been bypassed by conventional oil and gas recovery techniques because the hydrocarbons were not considered economically feasible to produce as a result of low permeability and associated uneconomical production rates.

In an unconventional resource reservoir, the hydrocarbon bearing reservoir, the seal, and the organic rich source rock that are in the hydrocarbon generation window are one and the same. A separate seal or other type of trapping mechanism is not usually required. Because unconventional resource reservoirs do not require conventional hydrocarbon bearing reservoir quality rock (e.g. high porosity and permeability rock) with favorable structural positions, large areas of unconventional resource reservoirs are potentially prospective. As a result, it is not unusual to see hundreds of thousands of acres of resource plays having unconventional resource reservoirs leased prior to drilling. To exploit the unconventional resource reservoirs requires the application of multi-stage hydraulic fracturing and tightly spaced vertical wells and/or horizontal wells with laterals of several thousand feet in length.

The production behavior of liquid-rich unconventional resource reservoirs (e.g. unconventional resource reservoirs predominantly having liquid hydrocarbons compared to gaseous hydrocarbons) is primarily a function of the rock properties, the fluid properties, and the type of hydraulic fracturing operation that was performed. The key parameters include fracture half length, spacing and conductivity, critical gas saturation, flowing bottom-hole pressure, and formation matrix permeability. However, primary production from unconventional resource reservoirs has been reported to be as low as 3% of the original-oil-in-place, thereby leaving up to 97% of the hydrocarbons in place when the unconventional resource reservoirs is abandoned.

Therefore, there is a need for new and improved enhanced oil recovery techniques that can be applied to unconventional resource reservoirs.

SUMMARY

In one embodiment, a method of enhanced oil recovery from an unconventional resource reservoir comprises injecting an enhanced recovery fluid comprising an unfractionated hydrocarbon mixture into the unconventional resource reservoir via an injection well, wherein the unfractionated hydrocarbon mixture is a by-product that is condensed at a temperature at or below 0 degrees Fahrenheit of a de-methanized hydrocarbon stream and comprises a mixture of ethane, propane, normal butane, isobutane, and pentane plus; and producing hydrocarbons from the unconventional resource reservoir via the injection well or a production well offset from the injection well.

In one embodiment, a method of enhanced oil recovery from an unconventional resource reservoir comprises injecting a gas comprising at least one of nitrogen, carbon dioxide, and methane into the unconventional resource reservoir via an injection well; and producing hydrocarbons from the unconventional resource reservoir via the injection well or a production well offset from the injection well.

In one embodiment, a method of enhanced oil recovery from an unconventional resource reservoir comprises running an inner string into an injection well; setting a packer assembly to isolate a section of perforation clusters and hydraulic fractures formed in the unconventional resource reservoir; injecting an enhanced recovery fluid through the inner string and into the isolated section and the unconventional resource reservoir; and producing hydrocarbons from the unconventional resource reservoir via the injection well or a production well offset from the injection well.

Figure 1:
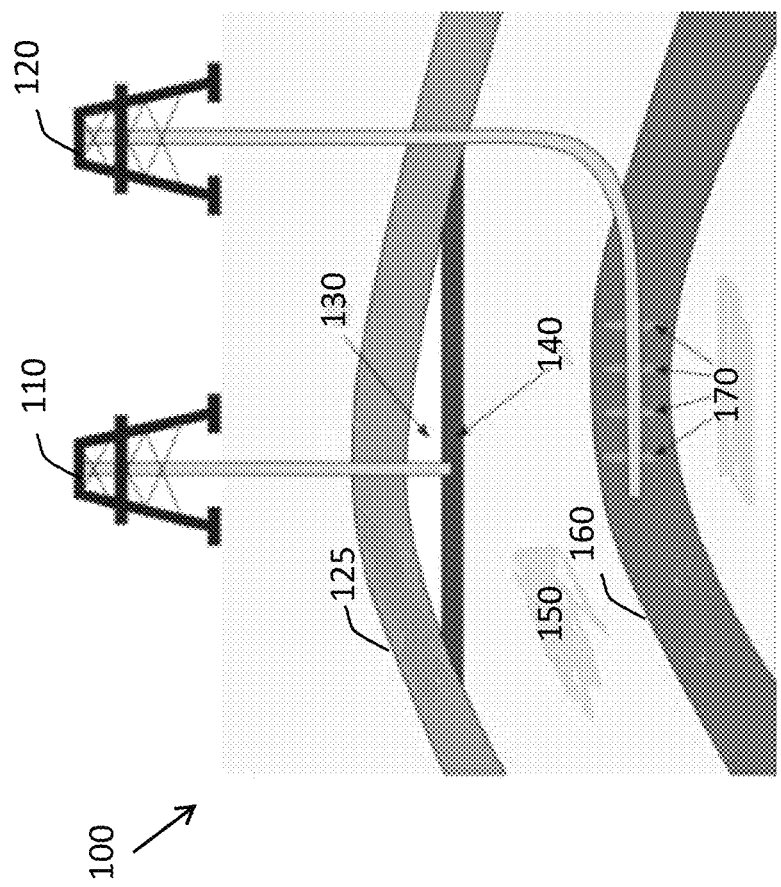
FIG. 1 is a schematic plan view of a conventional well and unconventional resource well.

It is contemplated that elements disclosed in one embodiment may be beneficially utilized on other embodiments without specific recitation.

DETAILED DESCRIPTION

The methods and systems described herein provide enhanced oil recovery techniques for use in unconventional resource reservoirs, including the injection of enhanced recovery fluids that are naturally occurring and are locally available as a low cost effective approach and that are able to reduce and/or eliminate the interfacial tension between residual oil-in-place and the enhanced recovery fluids. The enhanced recovery fluids can be used for enhanced or improved oil recovery. One type of enhanced recovery fluid comprises an unfractionated hydrocarbon mixture, such as Y-Grade natural gas liquids (referred to herein as Y-Grade NGL). Other types of enhanced recovery fluids comprise Y-Grade NGL, nitrogen, carbon dioxide, methane, or any combination thereof.

One type of enhanced recovery fluid comprises Y-Grade NGL only. Another type of enhanced recovery fluid comprises an emulsion of Y-Grade NGL, surfactant, water, and optionally a polymer. Another type of enhanced recovery fluid comprises a foam of Y-Grade NGL, surfactant, nitrogen, water, and optionally a polymer. Another type of enhanced recovery fluid comprises a mixture of Y-Grade NGL and a polymer. Another type of enhanced recovery fluid comprises a gas, including nitrogen, carbon dioxide, methane, or any combination thereof. Other types of enhanced recovery fluids comprise any combination of enhanced recovery fluid disclosed herein. Any type of enhanced recovery fluid disclosed herein can be used with any of the embodiments described below with respect to FIGS. 1-14.

The enhanced recovery fluids can be continuously injected into an unconventional resource reservoir with another fluid, such as nitrogen, carbon dioxide, and/or methane. The enhanced recovery fluids can be alternately injected into an unconventional resource reservoir with another fluid, such as nitrogen, carbon dioxide, and/or methane. A slug of the enhanced recovery fluids can be injected into an unconventional resource reservoir followed by a continuous slug of another fluid, such as nitrogen, carbon dioxide, and/or methane. The enhanced recovery fluids disclosed herein are excellent solvents and can improve mobility and conformance of the hydrocarbons within unconventional resource reservoirs.

Y-Grade NGL is an unfractionated hydrocarbon mixture comprising ethane, propane, normal butane, isobutane, and pentane plus. Pentane plus comprises pentane, isopentane, and/or heavier weight hydrocarbons, for example hydrocarbon compounds containing at least one of C5 through C8+. Pentane plus may include natural gasoline. The Y-Grade NGL composition may vary according to the unconventional or conventional reservoir that it is sourced.

Typically, Y-Grade NGL is a by-product of a de-methanized hydrocarbon stream that can be produced from shale wells and transported to a centralized facility where the de-methanized hydrocarbon stream is cooled to a temperature at or below 0 degrees Fahrenheit to condense out an unfractionated hydrocarbon mixture comprising ethane, propane, normal butane, isobutane, and pentane. The hydrocarbon streams are de-methanized to have a methane content of less than 1% or less than 0.5% by liquid volume. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-13 percent, to allow the Y-Grade NGL to be transported as a liquid in low pressure storage vessels. According to another example, Y-Grade NGL may be processed to have a high ethane content, such as an ethane content within a range of 38-60 percent, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture must be sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises dehydrated, desulfurized wellhead gas condensed components that have a vapor pressure of not more than about 600 psig at 100 degrees Fahrenheit, with aromatics below about 1 weight percent, and olefins below about 1% by liquid volume. Materials and streams useful for the embodiments described herein typically include hydrocarbons with melting points below about 0 degrees Fahrenheit.

In one embodiment, Y-Grade NGL comprises a mixture of ethane, propane, and butane (normal butane and/or isobutane) in an amount of at least 75% by liquid volume of the Y-Grade NGL composition. In one embodiment, Y-Grade NGL comprises ethane in an amount of at least 3% by liquid volume of the Y-Grade NGL composition. In one embodiment, Y-Grade NGL comprises a mixture of pentane plus in an amount less than 30% by liquid volume of the Y-Grade NGL composition.

In one embodiment, Y-Grade NGL is created in a local natural gas processing plant or splitter facility as a by-product of condensing a wet de-methanized natural gas stream at a temperature at or below 0 degrees Fahrenheit. This is typically accomplished by first dehydrating the natural gas stream to remove entrapped water, and then cooling the natural gas stream by reducing the temperature below the hydrocarbon dew point temperature (at or below 0 degrees Fahrenheit for example) to thereby condense a portion of the natural gas stream into Y-Grade NGL.

In one embodiment, sweep efficiencies can be improved if Y-Grade NGL is injected into an unconventional resource reservoir in pre-defined volumes (also referred to as "slugs") that are alternated with slugs of nitrogen, carbon dioxide, and/or methane to improve the mobility of the Y-Grade NGL injected into the unconventional resource reservoir as well as the hydrocarbons in the reservoir. In one embodiment, sweep efficiencies can be improved if a slug of Y-Grade NGL is injected into an unconventional resource reservoir followed by a continuous injection of a slug of nitrogen, carbon dioxide, and/or methane to improve the mobility of the Y-Grade NGL injected into the unconventional resource reservoir as well as the hydrocarbons in the reservoir.

In one embodiment, Y-Grade NGL may be mixed with a viscosity increasing agent, such as a polymer, for example hydrocarbon soluble block co-polymers. In one embodiment, Y-Grade NGL may be mixed with a surfactant, such as a nonionic surfactant, for example silicon or fluorinated. In one embodiment, Y-Grade NGL may be mixed with the surfactant to create an emulsion, or with the surfactant and nitrogen to create a foam. In one embodiment, the viscosity increasing agent and the surfactant may be mixed with a solubilizing fluid for subsequent mixture with the Y-Grade NGL.

FIG. 1 is a sectional view of a resource play 100 showing the difference between a conventional well 110 completed in a conventional hydrocarbon bearing reservoir and an unconventional resource well 120 completed in an unconventional resource reservoir according to one embodiment. Conventional well 110 is completed in conventional hydrocarbon bearing reservoir 150 that is sealed by formation 125 (e.g. a seal), which acts as an upper boundary to contain hydrocarbons below. Hydrocarbon bearing reservoir 150 has gas cap 130 and oil column 140 which was sourced from a source rock, such as a shale formation, and is referred to herein as an unconventional resource reservoir 160.

Unconventional resource well 120 is completed in unconventional resource reservoir 160, which acts as the hydrocarbon bearing reservoir, the seal, and the source rock all in one. The unconventional resource reservoir 160 is hydraulically fractured 170 to establish economically commercial rates of hydrocarbon production. The unconventional resource reservoir 160 includes hydrocarbons that have been bypassed by conventional oil and gas recovery techniques because the hydrocarbons (e.g. residual oil) were not considered economically feasible to produce as a result of low permeability and associated uneconomical production rates.

Figure 2:
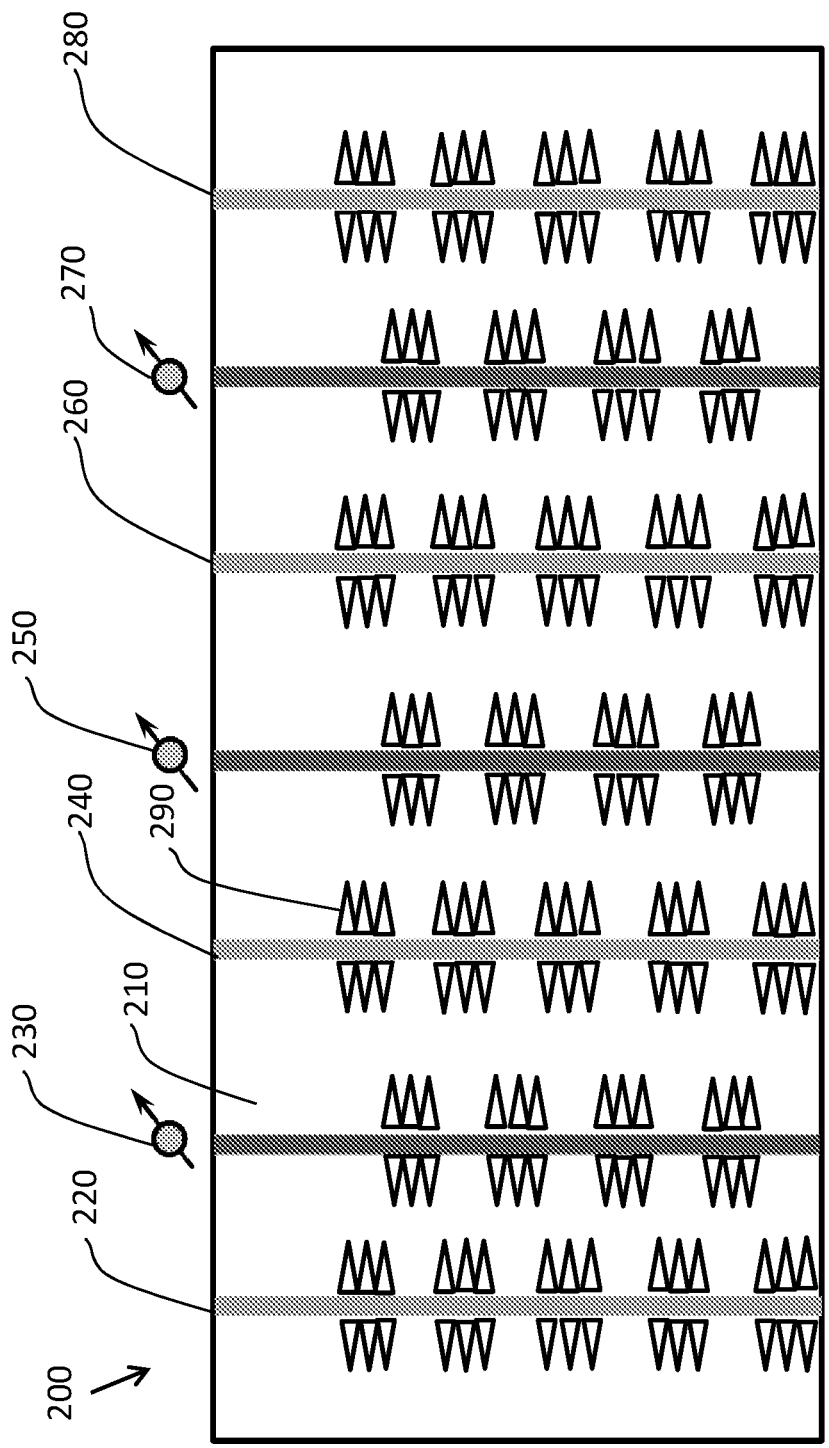
FIG. 2 is a schematic section view of an array of vertical unconventional resource wells.

FIG. 2 is a sectional view of a resource play 200 having an unconventional resource reservoir 210 completed with an array of vertical wells on a prescribed spacing pattern according to one embodiment. Unconventional resource production wells 220, 240, 260, and 280 are offset by unconventional resource injection wells 230, 250, and 270. All of the unconventional resource production and injection wells have been hydraulically fractured and have one or more sections of hydraulic fractures 290 in one or more intervals. Although shown as vertical wells, the production wells 220, 240, 260, and 280 and/or the injection wells 230, 250, and 270 can be horizontal wells. Each injection well 230, 250, and 270 has a pair of production wells that are offset from and/or located on opposite sides of the injection well 230, 250, and 270.

Figure 3:
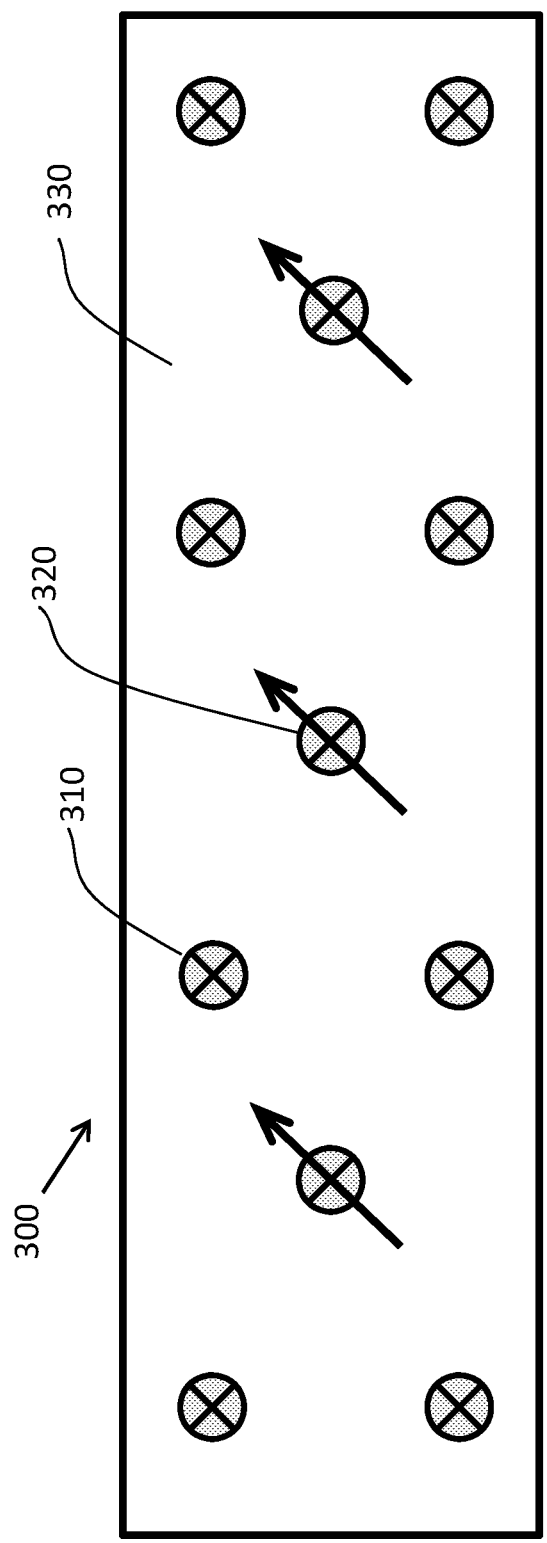
FIG. 3 is a schematic plan view of an array of unconventional resource wells.

FIG. 3 is a plan view of a resource play 300 having an unconventional resource reservoir 330 completed with an array of wells on a prescribed spacing pattern according to one embodiment. Unconventional resource production wells 310 are offset from unconventional resource injection wells 320. Each unconventional resource injection well 320 may be surrounded by a cluster of unconventional resource production wells 310.

Figure 4:
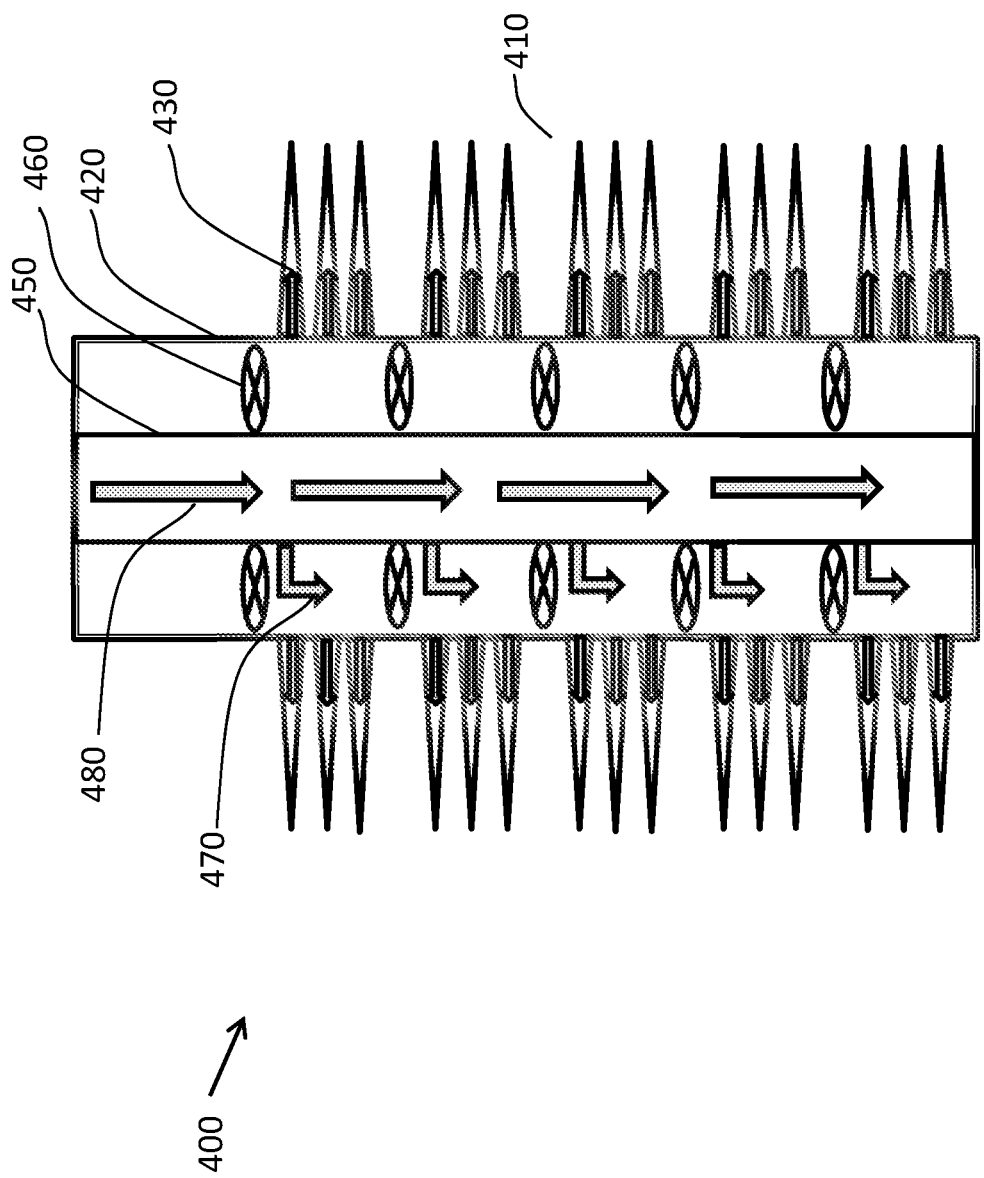
FIG. 4 is a schematic section view of a vertical unconventional resource injection well.

FIG. 4 is a sectional view of a resource play 400 having an unconventional resource reservoir 410 completed with at least one vertical or horizontal well according to one embodiment. The well is cemented with a casing string or liner string 420 through unconventional resource reservoir 410, which has been perforated and hydraulically fractured in one or more stages to create one or more sections of perforation clusters and hydraulic fractures 430 in the unconventional resource reservoir 410. An inner tubular string 450 is run into the well. Inner tubular string 450 comprises equally spaced packer assemblies comprised of hydraulically set packers 460, and gas lift mandrels and gas lift valves 470 positioned between each packer assembly.

The packers 460 are actuated into engagement with the casing string or liner string 420 to isolate the sections of perforation clusters and hydraulic fractures 430. Injected gas 480 enters inner tubing string 450 and flows through the gas lift mandrels and gas lift valves 470 into the isolated sections at a prescribed rate to regulate the volume of the injected gas 480 that is injected into the unconventional resource reservoir 410 at each isolated section via the perforation clusters and hydraulic fractures 430. In this manner, the injected gas 480 is uniformly distributed into the unconventional resource reservoir 410 at each isolated section.

In one embodiment, a chemical diverting agent can be injected into the unconventional resource reservoir 410 to temporarily block any of perforation clusters and hydraulic fractures 430 that are high volume or have larger openings through which a larger volume of the injected gas can flow relative to the remaining perforation clusters and hydraulic fractures 430 so that the injected gas 480 is uniformly injected into the unconventional resource reservoir 410.

Figure 5:
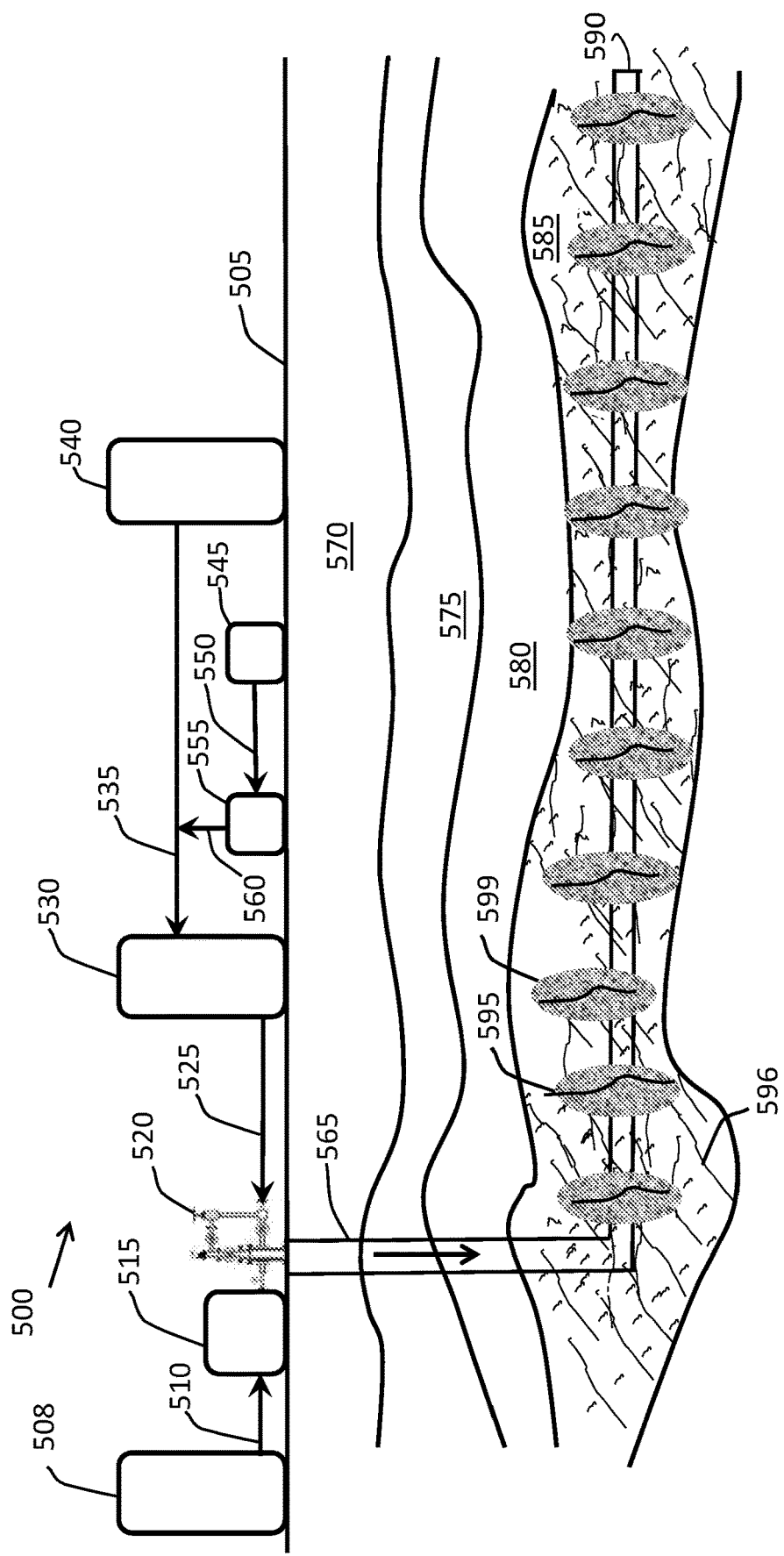
FIG. 5 is a schematic section view of a horizontal unconventional resource well.

FIG. 5 is a sectional view of a resource play 500 having an unconventional resource reservoir 585 that has both natural fractures 596 and hydraulically created fractures 595 (such as by a hydraulic fracturing stimulation) according to one embodiment. There are several formations below surface 505 including subsurface formation 570, subsurface formation 575, subsurface formation 580, and unconventional resource reservoir 585. Horizontal injection well 565 traverses subsurface formations 570, 575, 580, terminating in unconventional resource reservoir 585 with an extended horizontal lateral section 590. Injection facilities located on surface 505 are comprised of Y-Grade NGL storage tanks 540 connected to injection pump 530 via line 535 discharging to injection wellhead 520 via line 525.

A surfactant and/or a polymer from storage tank 545 is connected to dosing pump 555 via line 550 and to line 535 via discharge line 560. Liquid nitrogen (N2) is stored in liquid nitrogen storage tank and cryogenic pump skid 508. Liquid N2 is pumped from skid 508 to vaporizer 515 via line 510. Gaseous N2 is discharged from vaporizer 515 into injection wellhead 520 where it is mixed with pressurized Y-Grade NGL and surfactant and/or polymer to form pressurized Y-Grade NGL foam. Pressurized Y-Grade NGL foam is pumped down injection well 565 into extended horizontal lateral section 590, which has previously been completed with a multi-staged hydraulic fracturing stimulation as represented by hydraulic fractures 595. Pressurized Y-Grade NGL foam 599 is injected into unconventional resource reservoir 585 via hydraulic fractures 595 and natural fractures 596.

Figure 6:
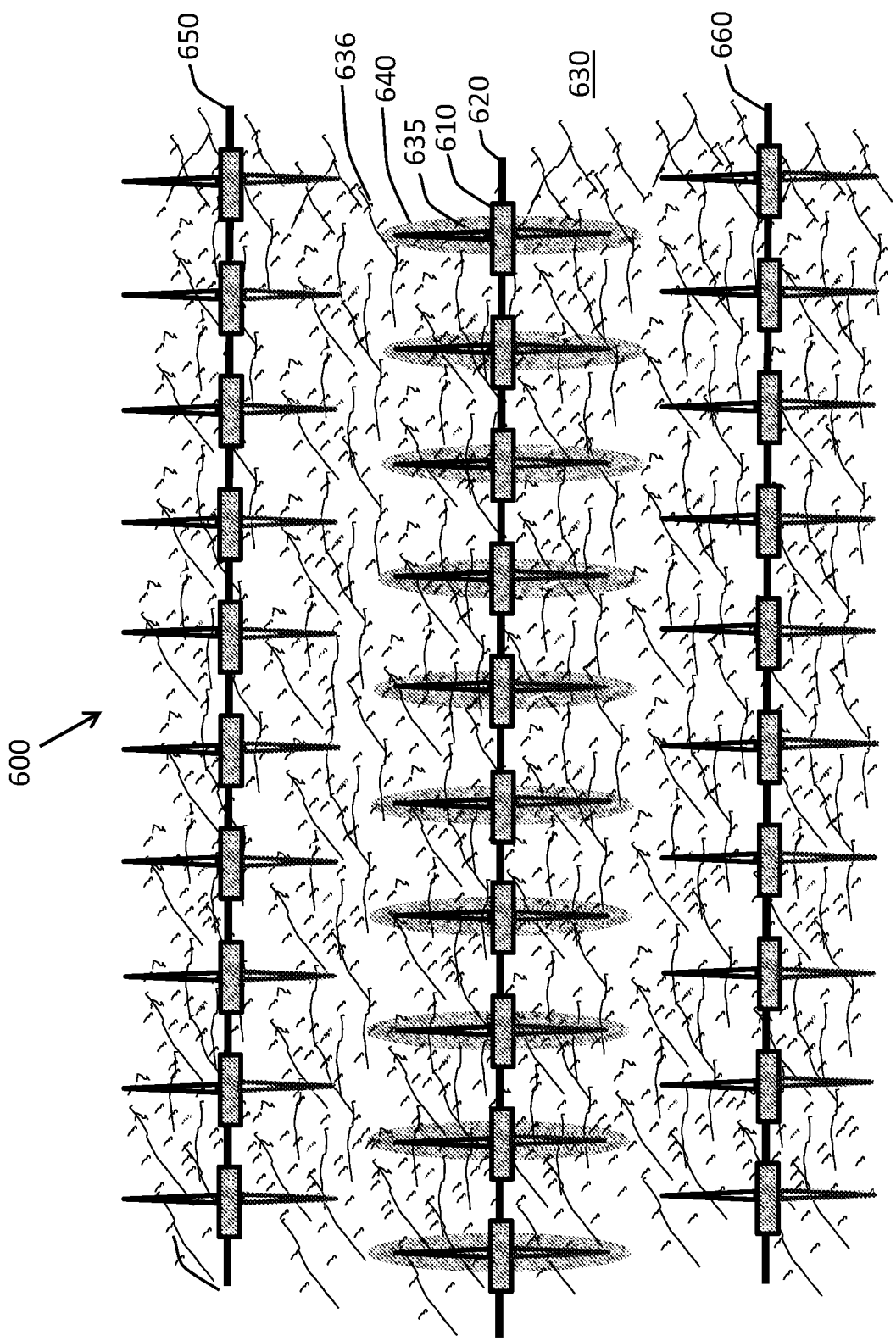
FIG. 6 is a schematic plan view of an array of horizontal unconventional resource wells

FIG. 6 is a plan view of a resource play 600 having an unconventional resource reservoir 630 that has both natural fractures 636 and hydraulically created fractures 635 (such as by a hydraulic fracturing stimulation) according to one embodiment. The unconventional resource reservoir 630 includes horizontal lateral production wellbores 650 and 660, and horizontal lateral injection wellbore 620 each completed with multi-stage hydraulic fracturing stimulations. An enhanced recovery fluid 640, such as Y-Grade NGL, Y-Grade NGL emulsion, Y-Grade NGL foam, nitrogen, carbon dioxide, and/or methane enters unconventional resource reservoir 630 via perforation cluster 610, hydraulic fractures 635, and natural fractures 636.

Figure 7:
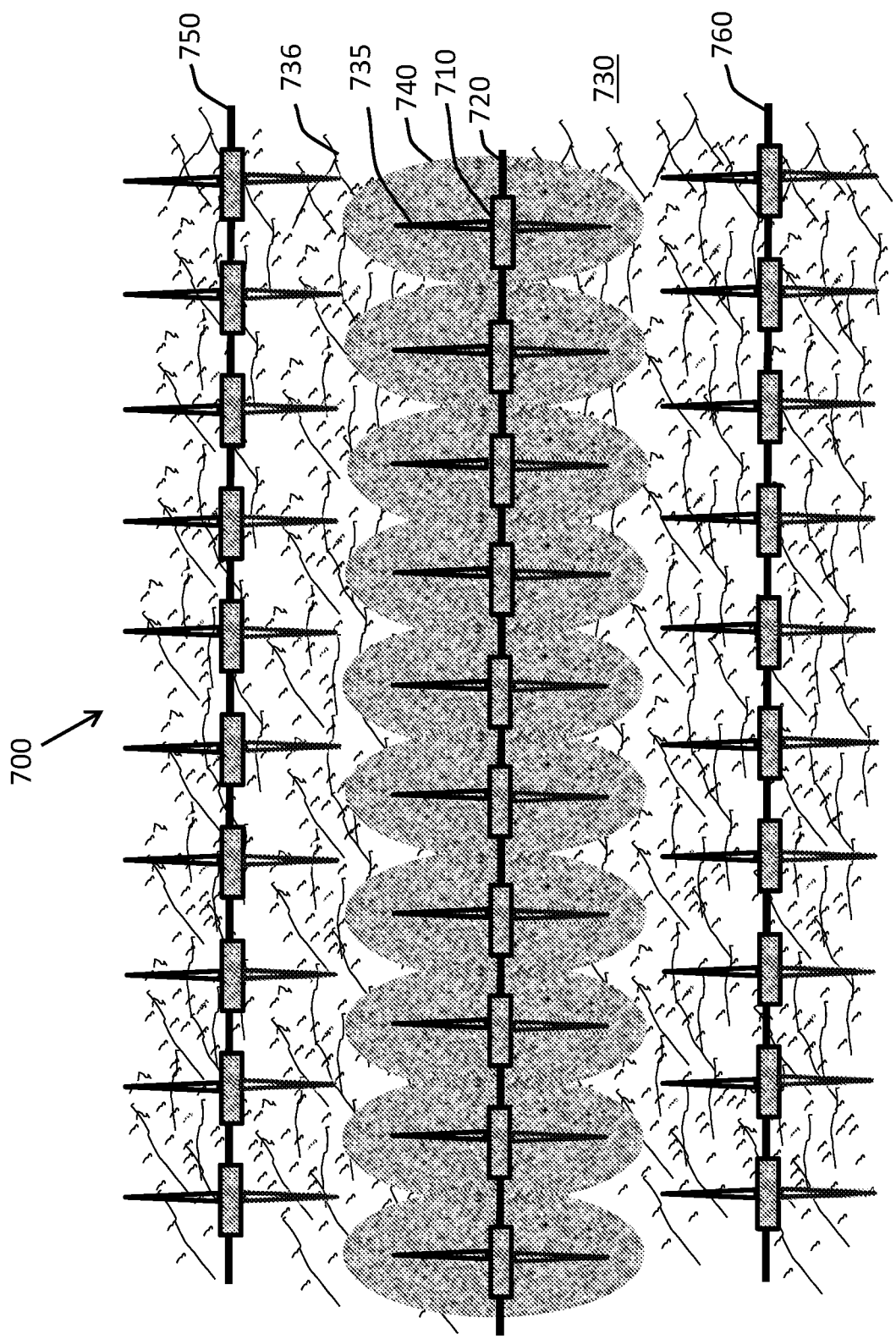
FIG. 7 is a schematic time-lapsed plan view of an array of horizontal resources wells.

FIG. 7 is an illustrated time-lapsed plan view of a resource play 700 having an unconventional resource reservoir 730 that has both natural fractures 736 and hydraulically created fractures 735 (such as by a hydraulic fracturing stimulation) according to one embodiment. The unconventional resource reservoir 730 includes horizontal lateral production wellbores 750 and 760, and horizontal lateral injection wellbore 720 each completed with multi-stage hydraulic fracturing stimulations. An enhanced recovery fluid 740, such as Y-Grade NGL, Y-Grade NGL emulsion, Y-Grade NGL foam, nitrogen, carbon dioxide, and/or methane enters unconventional resource reservoir 730 via perforation cluster 710, hydraulic fractures 735, and natural fractures 736 from horizontal injection well 720 where it disperses, mobilizes, and displaces oil, natural gas, water, Y-Grade NGL, nitrogen, carbon dioxide, and/or methane towards offset horizontal lateral production wellbores 750 and 760. The fluids are produced back to the surface via horizontal lateral production wellbores 750 and 760.

Figure 8:
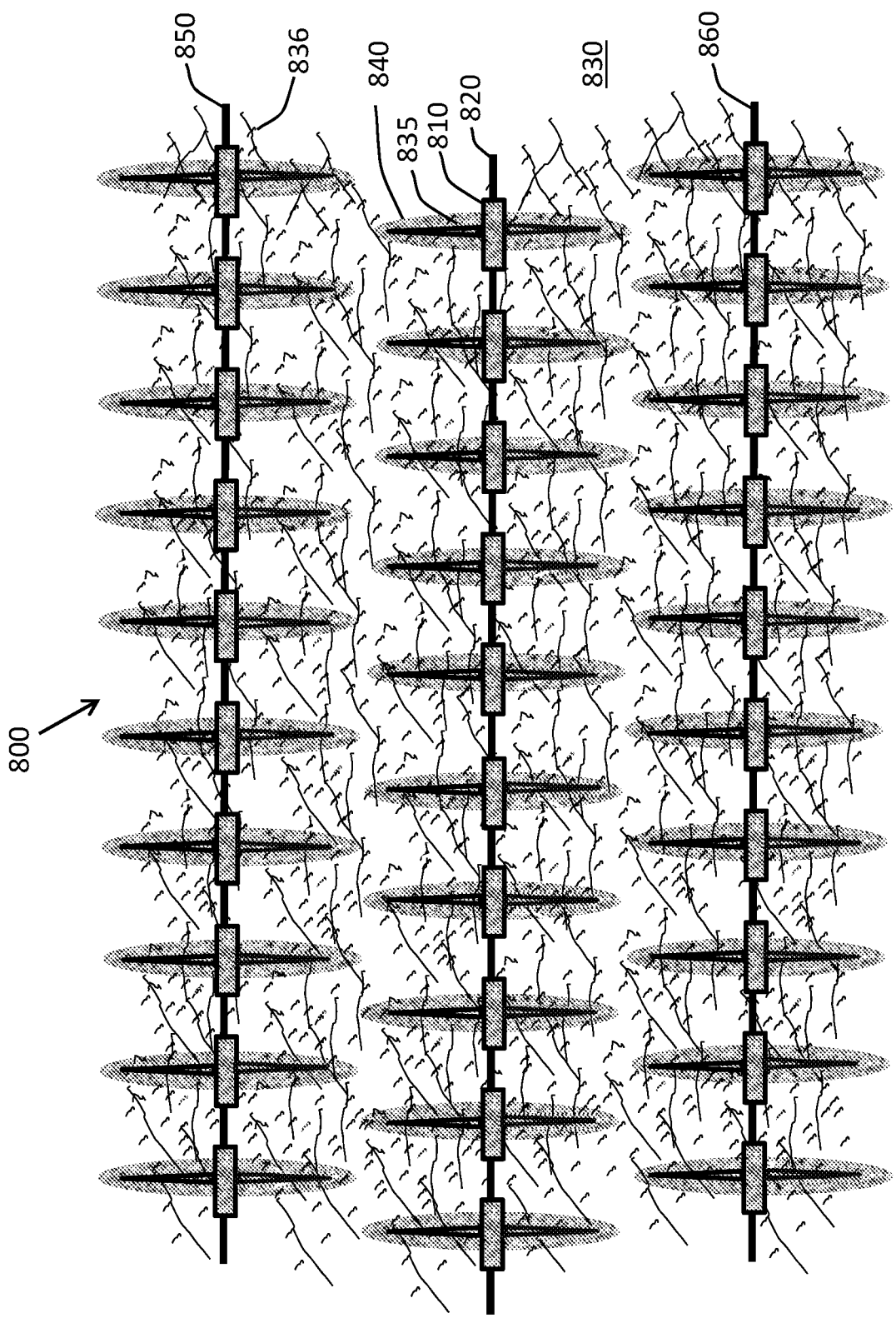
FIG. 8 is a schematic plan view of an array of horizontal unconventional resource wells

FIG. 8 is a plan view of a resource play 800 having an unconventional resource reservoir 830 that has both natural fractures 836 and hydraulically created fractures 835 (such as by a hydraulic fracturing stimulation) according to one embodiment. The unconventional resource reservoir 830 includes horizontal lateral wellbores 820, 850, and 860 each completed with multi-stage hydraulic fracturing stimulations. An enhanced recovery fluid 840, such as Y-Grade NGL, Y-Grade NGL emulsion, Y-Grade NGL foam, nitrogen, carbon dioxide, and/or methane enters unconventional resource reservoir 830 via perforation cluster 810, hydraulic fractures 835, and natural fractures 836 simultaneously in horizontal lateral production wellbores 820, 850, and 860.

Figure 9:
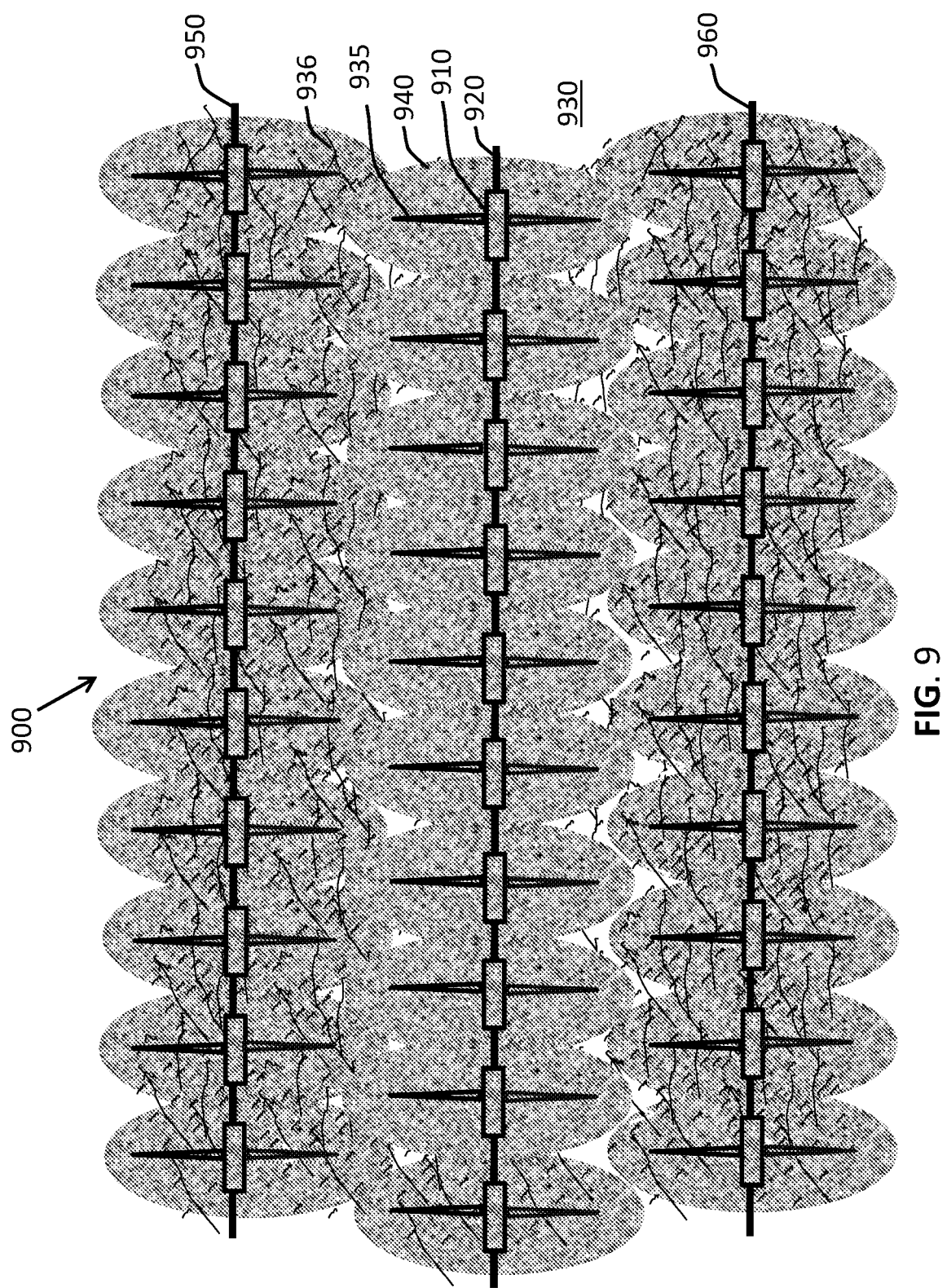
FIG. 9 is a schematic time-lapsed plan view of an array of horizontal resources wells.

FIG. 9 is an illustrated of a time-lapsed plan view of a resource play 900 having an unconventional resource reservoir 930 that has both natural fractures 936 and hydraulically created fractures 935 (such as by a hydraulic fracturing stimulation) according to one embodiment. The unconventional resource reservoir 930 includes horizontal lateral wellbores 920, 950, and 960 each completed with multi-stage hydraulic fracturing stimulations. An enhanced recovery fluid 940, such as Y-Grade NGL, Y-Grade NGL emulsion, Y-Grade NGL foam, nitrogen, carbon dioxide, and/or methane is injected into unconventional resource reservoir 930 via perforation cluster 910, hydraulic fractures 935, and natural fractures 936 simultaneously in horizontal lateral wellbores 920, 950, and 960. The enhanced recovery fluid 940 expands and disperses within unconventional resource reservoir 930. Following an extended soaking cycle, mobilized oil, natural gas, water, Y-Grade NGL, nitrogen, carbon dioxide, and/or methane are then produced back to the surface from unconventional resource reservoir 930 via horizontal lateral wellbores 920, 950, and 960.

Figure 10:
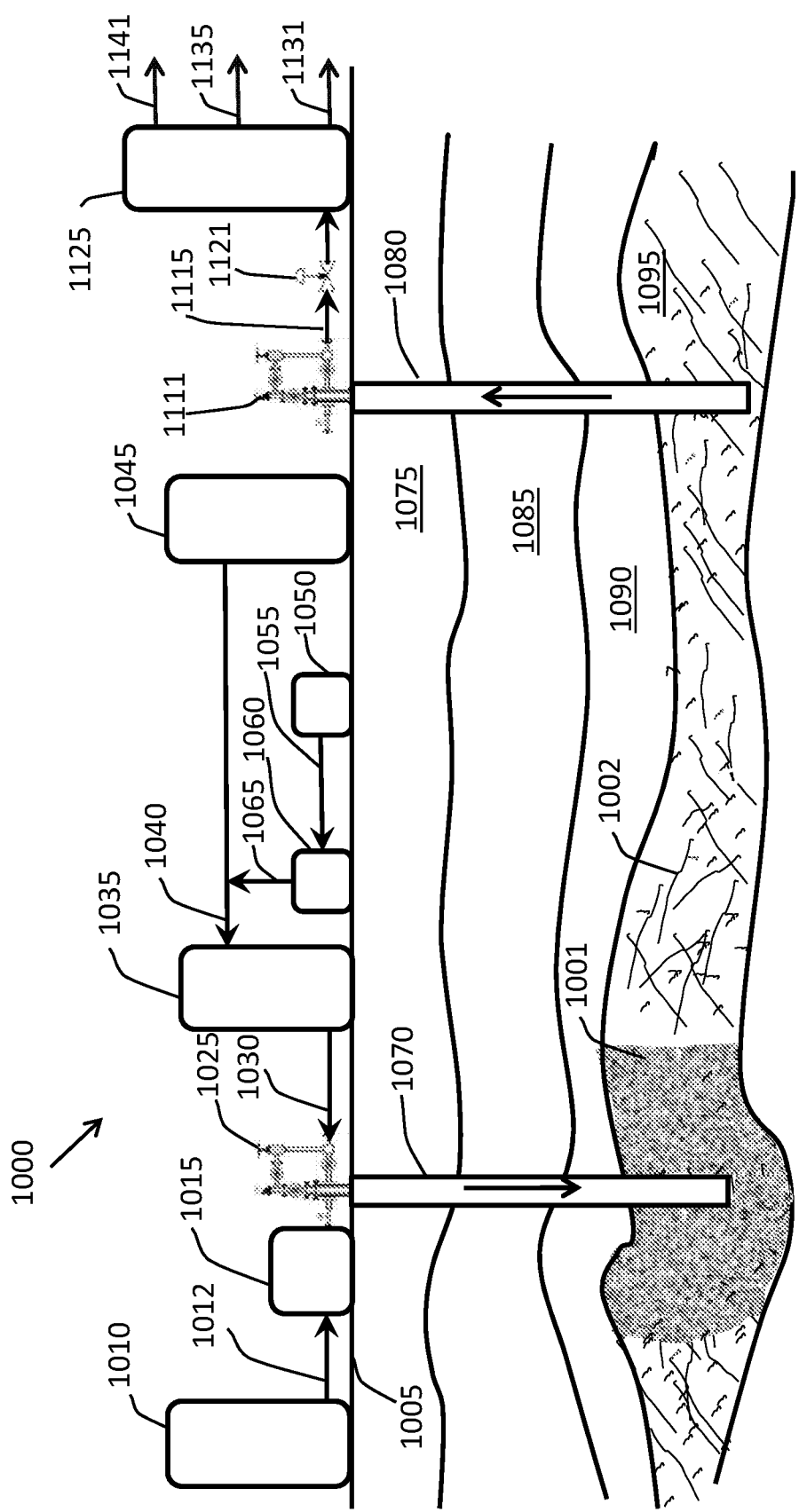
FIG. 10 is a schematic section view of a vertical unconventional resource well.

FIG. 10 is a sectional view of a resource play 1000 having an unconventional resource reservoir 1095 that has natural fractures 1002 according to one embodiment. There are several formations below surface 1005 including subsurface formation 1075, subsurface formation 1085, subsurface formation 1090, and unconventional resource reservoir 1095. Vertical injection well 1070 traverses subsurface formations 1075, 1085, 1090, terminating in unconventional resource reservoir 1095. Injection facilities located on surface 1005 are comprised of Y-Grade NGL storage tanks 1045 connected to injection pump 1035 via line 1040 discharging to injection wellhead 1025 via line 1030.

A surfactant and/or a polymer from storage tank 1050 is connected to dosing pump 1060 via line 1055 and to line 1040 via discharge line 1065. Liquid nitrogen (N2) stored in liquid nitrogen storage tank and cryogenic pump skid 1010 is discharged into vaporizer 1015 via line 1012 and into injection wellhead 1025 where it is mixed with pressurized Y-Grade NGL and surfactant and/or polymer to form pressurized Y-Grade NGL foam. A pressurized Y-Grade NGL foam 1001 is continuously pumped down injection well 1070 into unconventional resource reservoir 1095 where it disperses, mobilizes, and displaces oil, natural gas, water, and Y-Grade NGL to production well 1080 where the fluids are produced to the surface 1005 to production wellhead 1111 and directed into three-phase separator 1125 via line 1115 and choke 1121. Separated oil, Y-Grade NGL, and condensate are transferred to existing surface storage tanks via line 1135, and water is transferred to existing surface storage tanks via line 1131. Separated gas is transferred to gas gathering system via line 1141.

Figure 11:
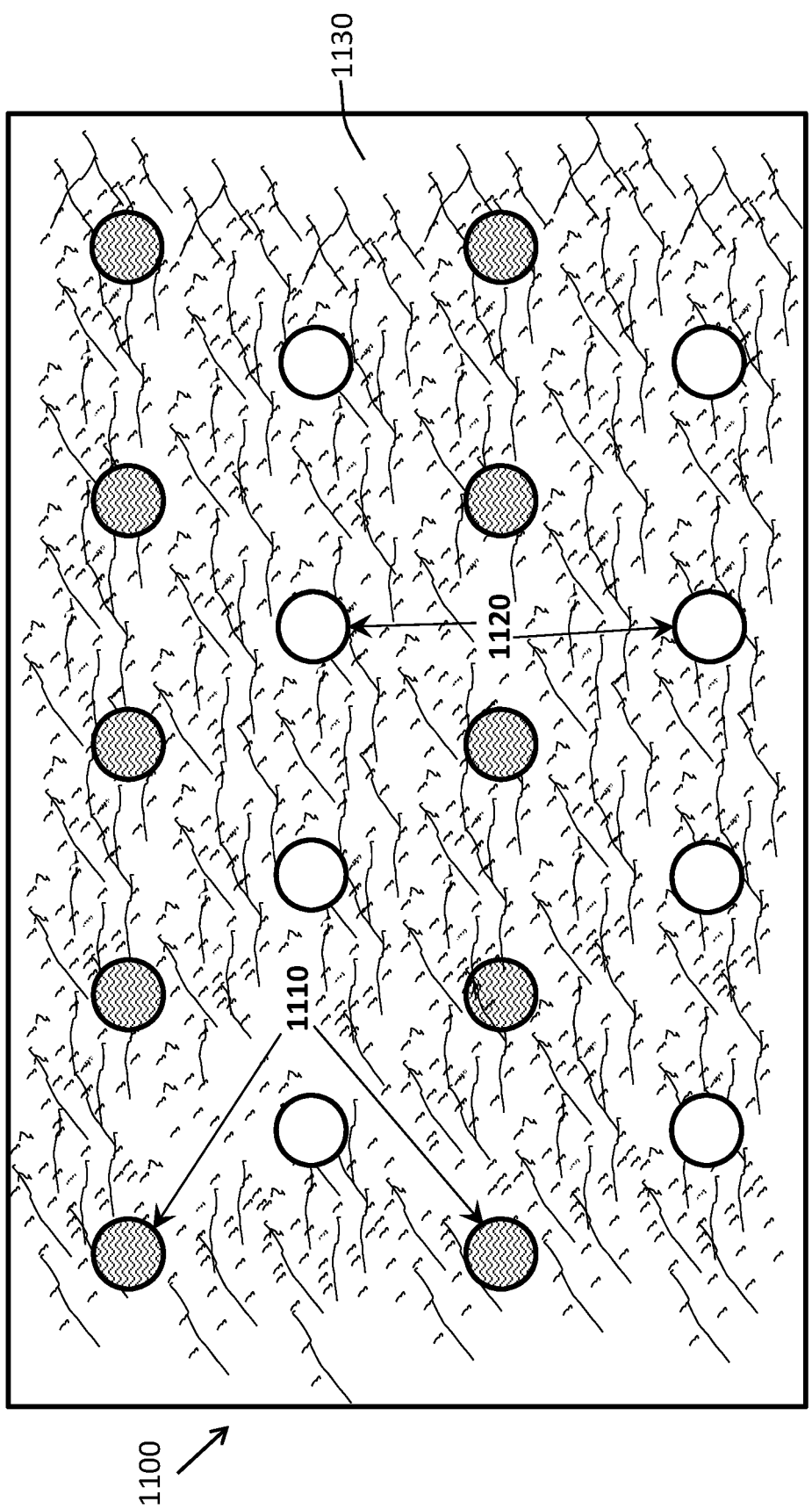
FIG. 11 is a schematic plan view of an array of unconventional resource wells.

FIG. 11 is a plan view of a resource play 1100 having an unconventional resource reservoir 1130 completed with an array of wells according to one embodiment. The array of wells includes well group 1110 denoted by circles with cross-hatched lines, and well group 1120 denoted by circles without cross-hatching. In one embodiment, an enhanced recovery fluid, such as Y-Grade NGL, Y-Grade NGL emulsion, Y-Grade NGL foam, nitrogen, carbon dioxide, and/or methane will be injected into well group 1110, and oil, natural gas, water, Y-Grade NGL, nitrogen, carbon dioxide, and/or methane will be recovered in well group 1120. In one embodiment, well group 1110 may be used for injection of the enhanced recovery fluid, and well group 1120 may be used for producing oil, natural gas, water, Y-Grade NGL, nitrogen, carbon dioxide, and/or methane from the unconventional resource reservoir 1130; and subsequently well group 1120 may be used for injection of the enhanced recovery fluid, and well group 1110 may be used for producing oil, natural gas, water, Y-Grade NGL, nitrogen, carbon dioxide, and/or methane from the unconventional resource reservoir 1130.

Figure 12:
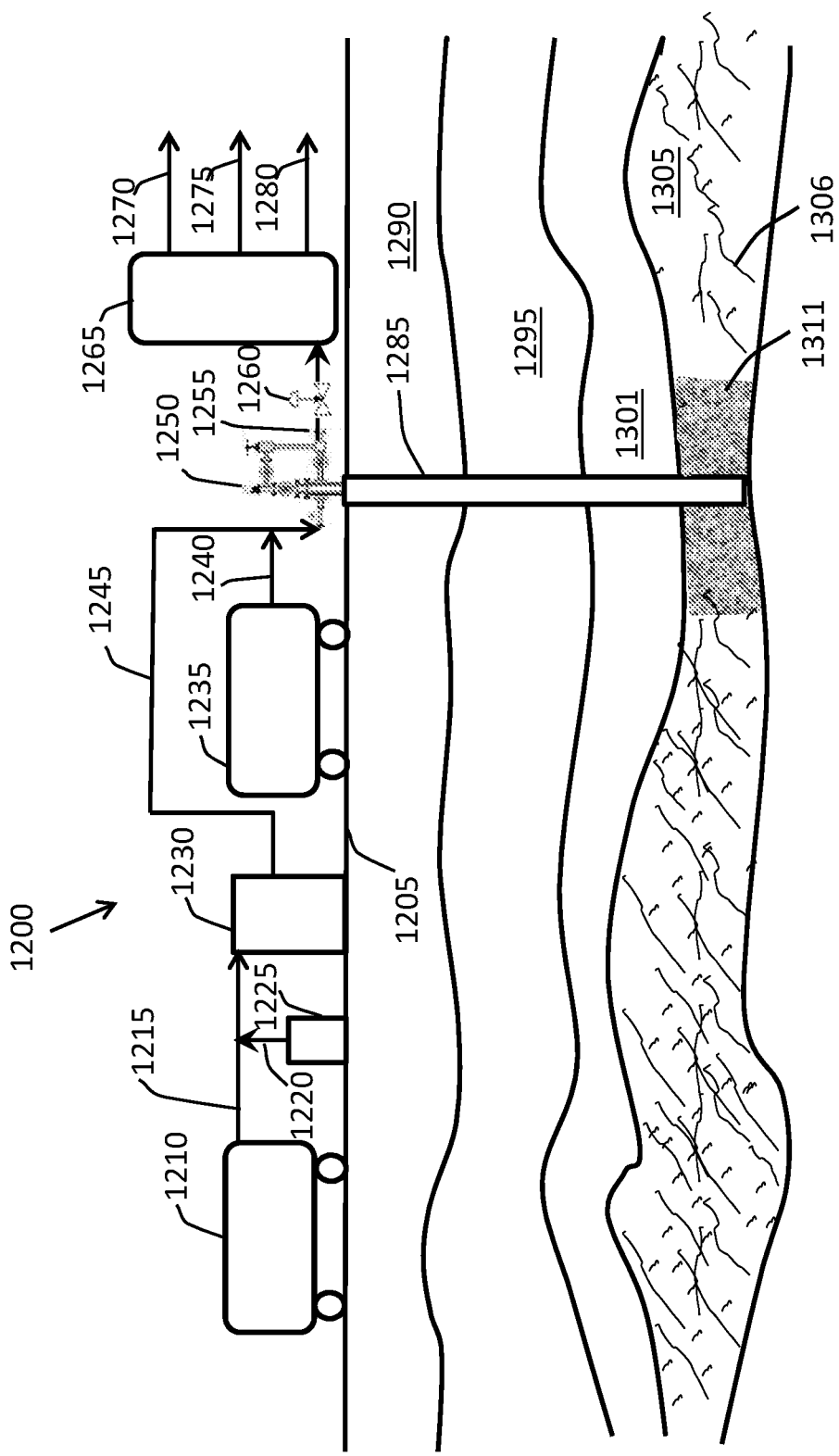
FIG. 12 is a schematic section view of a vertical unconventional resource well.

FIG. 12 is a sectional view of a resource play 1200 having an unconventional resource reservoir 1305 that has natural fractures 1306 according to one embodiment. There are several formations below surface 1205 including subsurface formation 1290, subsurface formation 1295, subsurface formation 1301, and unconventional resource reservoir 1305. Vertical well 1285 traverses subsurface formations 1290, 1295, 1301, terminating in unconventional resource reservoir 1305. Mobile facilities located on surface 1205 are comprised of mobile Y-Grade NGL tanker(s) 1210 connected to injection pump 1230 via line 1215, which is connected to wellhead 1250 via line 1245.

A surfactant and/or polymer dosing pump and storage tank 1225 is connected via line 1220 to injection pump 1230 via line 1215. Nitrogen (N2) from mobile tanker with vaporization or heat recovery unit 1235 is connected to wellhead 1250 via line 1240 where it is mixed with pressurized Y-Grade NGL from Y-Grade NGL tanker(s) 1210 and surfactant and/or polymer from tank 1225 to generate pressurized Y-grade NGL foam. Pressurized Y-Grade NGL foam 1311 is pumped down vertical well 1285 into unconventional resource reservoir 1305 where it expands and disperses within unconventional resource reservoir 1305. Following an extended soaking cycle, mobilized oil, natural gas, water, and/or Y-Grade NGL are then produced back to the surface 1205 from unconventional resource reservoir 1305 via vertical well 1285 to wellhead 1250, and directed into a three-phase separator 1265 controlled by choke 1260 via line 1255. Gas separated in separator 1265 is sent to a gas gathering pipeline 1270, and separated liquid hydrocarbons and water are transported via lines 1275 and 1280 respectively to liquid storage tanks.

Figure 13:
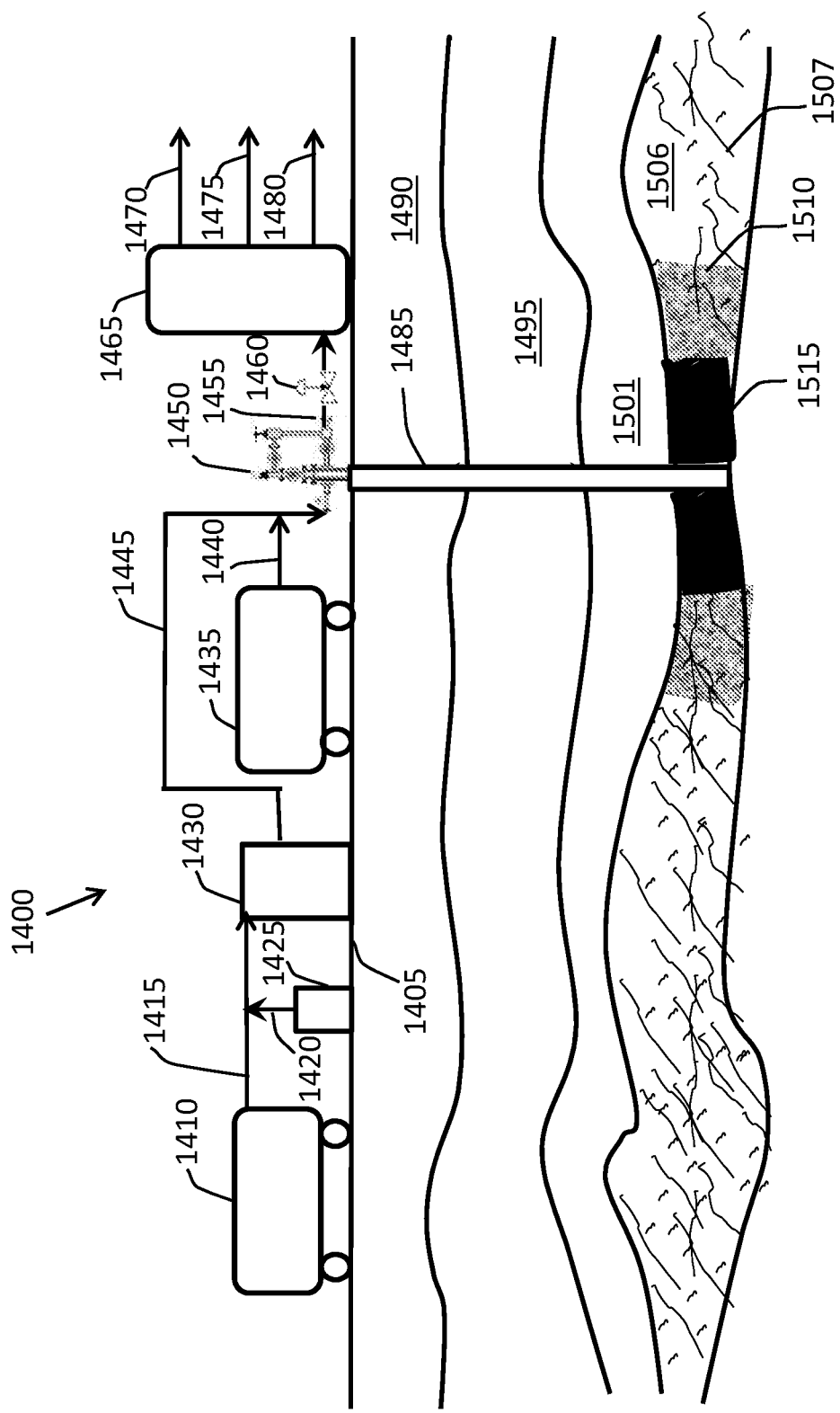
FIG. 13 is a schematic section view of a vertical unconventional resource well.

FIG. 13 is a sectional view of a resource play 1400 having an unconventional resource reservoir 1506 that has natural fractures 1507 according to one embodiment. There are several formations below surface 1405 including subsurface formation 1490, subsurface formation 1495, subsurface formation 1501, and unconventional resource reservoir 1506. Vertical well 1485 traverses subsurface formations 1490, 1495, 1501, terminating in unconventional resource reservoir 1506. Mobile facilities located on surface 1405 are comprised of mobile Y-Grade NGL tanker(s) 1410 connected to injection pump 1430 via line 1415, which is connected to wellhead 1450 via line 1445.

A surfactant and/or polymer dosing pump and storage tank 1425 is connected via line 1420 to injection pump 1430 via line 1415. Nitrogen (N2) from mobile tanker with vaporization or heat recovery unit 1435 is connected to wellhead 1450 via line 1440 where it is mixed with pressurized Y-Grade NGL from Y-Grade NGL tanker(s) 1410 and surfactant and/or polymer from tank 1425 to generate pressurized Y-Grade NGL foam. A slug of pressurized Y-Grade NGL foam 1510 (which may contain nitrogen) is pumped down vertical well 1485 into unconventional resource reservoir 1506, and is followed by a continuous slug of gaseous nitrogen 1515 only to help disperse the Y-Grade NGL foam 1510 within the unconventional resource reservoir 1506. In one embodiment, one or more slugs of Y-Grade NGL foam 1510 may be alternately injected with one or more slugs of gaseous nitrogen 1515 into the unconventional resource reservoir 1506.

Following an extended soaking cycle, mobilized oil, natural gas, water, and/or Y-Grade NGL are displaced and produced back to the surface 1405 from resource reservoir 1506 via vertical well 1485 to wellhead 1450, and directed into a three-phase separator 1465 controlled by choke 1460 via line 1455. Gas separated in separator 1465 is sent to a gas gathering pipeline 1470, and separated liquid hydrocarbons and water are transported via lines 1475 and 1480 respectively to liquid storage tanks.

Figure 14:
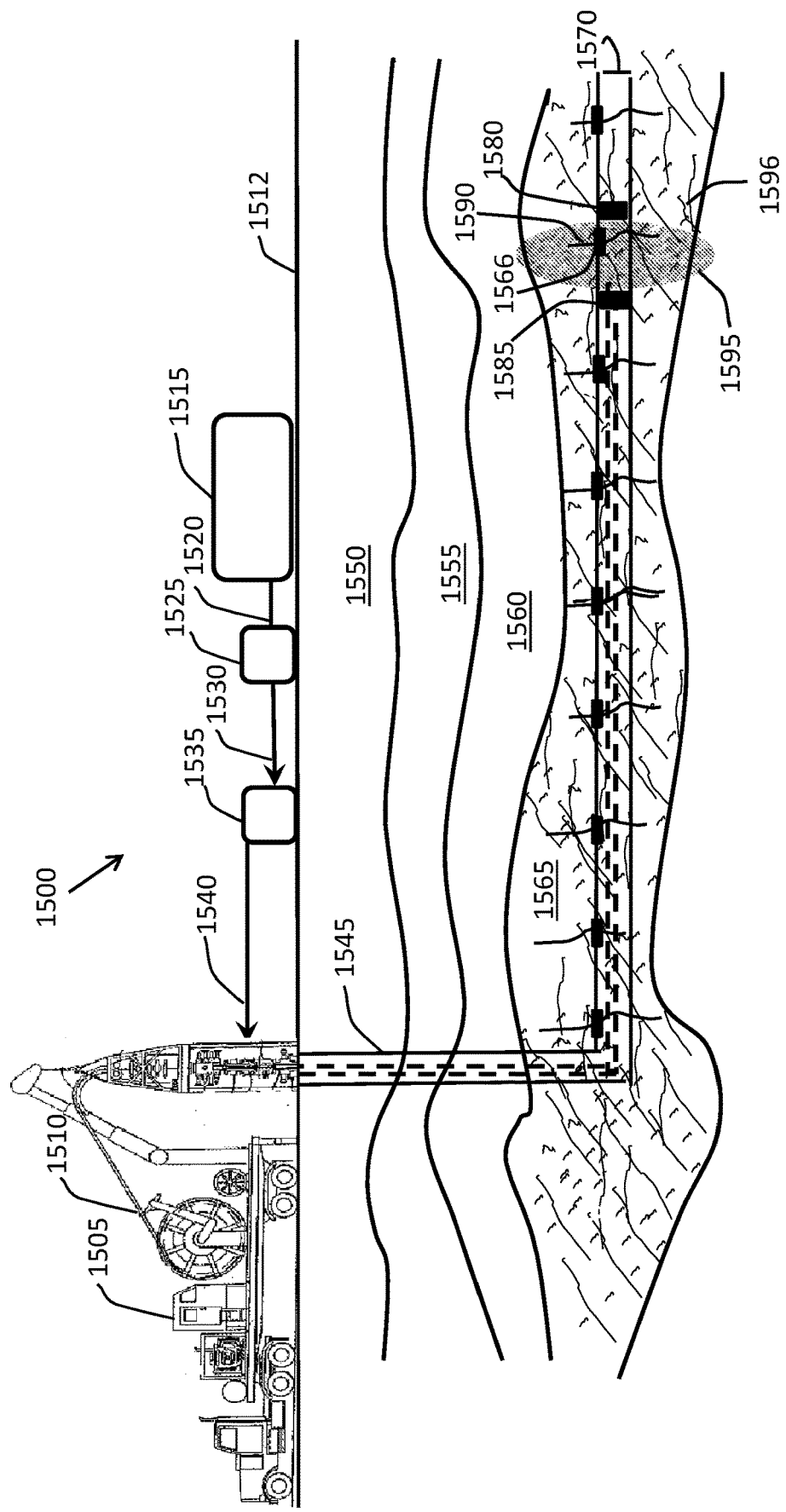
FIG. 14 is a schematic section view of a horizontal unconventional resource well.

FIG. 14 is a sectional view of a resource play 1500 having an unconventional resource reservoir 1565 that has both natural fractures 1596 and hydraulically created fractures 1590 (such as by a hydraulic fracturing stimulation) according to one embodiment. There are several formations below surface 1512 including subsurface formation 1550, subsurface formation 1555, subsurface formation 1560, and unconventional resource reservoir 1565. Well 1545 traverses subsurface formations 1550, 1555, 1560, terminating in unconventional resource reservoir 1565. Mobile coiled tubing unit 1505 located on surface 1512 provides an inner coiled tubing string 1510 that is run into well 1545 to the toe of lateral section 1570 of well 1545.

A packer assembly coupled to the inner coiled tubing string 1510, comprising retrievable bridge plug 1580 and packer 1585, is set to isolate a section of perforation cluster 1566 and hydraulic fractures 1590. Nitrogen (N2) from liquid N2 storage tank 1515 is transferred by cryogenic pump 1525 via line 1520 to vaporizer 1535 via line 1530. Gaseous nitrogen 1595 is transferred via line 1540 from vaporizer 1535 to the isolated section of perforation cluster 1566 and hydraulic fractures 1590 through inner coiled tubing string 1510. The gaseous nitrogen 1595 then flows into unconventional resource reservoir 1565 via the perforation cluster 1566, hydraulic fractures 1590, and natural fractures 1596.

In one embodiment, a thermal decay time log, a carbon-oxygen log, or a cased-hole pulsed neutron log may be run prior to injecting the enhanced recovery fluid into the unconventional resource reservoir and then after producing the hydrocarbons from the unconventional resource reservoir to quantitatively establish the amount of residual oil that has been mobilized, displaced, and produced.

In one embodiment, a first array of vertical and/or horizontal wells comprises a mechanism to inject a continuous slug of an enhanced recovery fluid (comprising Y-Grade NGL for example) into an unconventional resource reservoir formation for a period of time to displace, re-pressurize and sweep the reservoir, while a second array of vertical and/or horizontal wells comprises a mechanism to produce hydrocarbons from the reservoir during the total period of time when the enhanced recovery fluid is being injected.

In one embodiment, a first array of vertical and/or horizontal wells comprises a mechanism to inject a continuous slug of an enhanced recovery fluid comprising an emulsion of Y-Grade NGL, surfactant, and water into an unconventional resource reservoir for a period of time to displace, re-pressurize and sweep the reservoir, while a second array of vertical and/or horizontal wells comprises a mechanism to produce hydrocarbons from the reservoir during the total period of time when the emulsion of Y-Grade NGL, surfactant, and water is being injected.

In one embodiment, a first array of vertical and/or horizontal wells comprises a mechanism to inject alternating slugs of an enhanced recovery fluid (comprising Y-Grade NGL for example) and nitrogen into an unconventional resource reservoir to displace re-pressurize and sweep the reservoir, while a second array of vertical and/or horizontal wells comprises a mechanism to produce hydrocarbons from the reservoir during the total period of time when the alternating slugs of the enhanced recovery fluid and nitrogen are being injected.

In one embodiment, a first array of vertical and/or wells comprises a mechanism to inject a continuous slug of an enhanced recovery fluid comprising a foam of Y-Grade NGL, surfactant, and nitrogen into an unconventional resource reservoir to displace and sweep the reservoir, while a second array of vertical and/or horizontal wells comprises a mechanism to produce hydrocarbons from the reservoir during the total period of time when the foam of Y-Grade NGL, surfactant, and nitrogen is being injected.

In one embodiment, a cycle known as "huff and puff" for producing hydrocarbons from an unconventional resource reservoir comprises a single vertical or horizontal well and a repeatable mechanism to inject a continuous slug of an enhanced recovery fluid (comprising Y-Grade NGL for example) into the reservoir for a period of time, followed by a period of time when the single vertical or horizontal well is shut-in to allow for soaking, dispersion, and imbibition of the enhanced recovery fluid within the reservoir, followed by a period of time returning the single vertical or horizontal well to production to produce hydrocarbons from the reservoir that have been mobilized by the injection of the enhanced recovery fluid, and then repeating the cycle.

In one embodiment, a cycle known as "huff and puff" for producing hydrocarbons from an unconventional resource reservoir comprises a single vertical or horizontal well and a repeatable mechanism to inject a continuous slug of an enhanced recovery fluid comprising an emulsion generated by mixing Y-Grade NGL, surfactant, and water, into the reservoir for a period of time, followed by a period of time when the single vertical or horizontal well is shut-in to allow for soaking, dispersion, and imbibition of the emulsion within the reservoir, followed by a period of time returning the single vertical or horizontal well to production to produce hydrocarbons from the reservoir that have been mobilized by the injection of the emulsion, and then repeating the cycle.

In one embodiment, a cycle known as "huff and puff" for producing hydrocarbons from an unconventional resource reservoir comprises a single vertical or horizontal well and a repeatable mechanism to inject alternating slugs of an enhanced recovery fluid (comprising Y-Grade NGL for example) and nitrogen into the reservoir for a period of time, followed by a period of time when the single vertical or horizontal well is shut-in to allow for soaking, dispersion, and imbibition of the alternating slugs of enhanced recovery fluid and nitrogen within the reservoir, followed by a period of time returning the single vertical or horizontal well to production to produce hydrocarbons from the reservoir that have been mobilized by the alternating injections of the slugs of enhanced recovery fluid and nitrogen, and then repeating the cycle.

In one embodiment, a cycle known as "huff and puff" for producing hydrocarbons from an unconventional resource reservoir comprises a single vertical or horizontal well and a repeatable mechanism to inject a continuous slug of an enhanced recovery fluid comprising a foam generated by mixing Y-Grade NGL, surfactant, nitrogen, and water, into the reservoir for a period of time, followed by a period of time when the single vertical or horizontal well is shut-in to allow for soaking, dispersion, and imbibition of the foam within the reservoir, followed by a period of time returning the single vertical or horizontal well to production to produce hydrocarbons from the reservoir that have been mobilized by the injection of the foam, and then repeating the cycle.

In one embodiment, a method of enhanced oil recovery from an unconventional resource reservoir comprises injecting an enhanced recovery fluid comprising an unfractionated hydrocarbon mixture into the unconventional resource reservoir via an injection well, wherein the unfractionated hydrocarbon mixture a by-product that is condensed at a temperature at or below 0 degrees Fahrenheit of a demethanized hydrocarbon stream and comprises a mixture of ethane, propane, normal butane, isobutane, and pentane plus; and producing hydrocarbons from the unconventional resource reservoir via the injection well or a production well offset from the injection well. The injection well comprises an array of injection wells. The production well comprises an array of production wells.

The method further comprises mixing the unfractionated hydrocarbon mixture with a polymer to form the enhanced recovery fluid. The method further comprises mixing the unfractionated hydrocarbon mixture with a surfactant and water to create an emulsion forming the enhanced recovery fluid. The method further comprises mixing the unfractionated hydrocarbon mixture with a surfactant, water, and nitrogen to create a foam forming the enhanced recovery fluid.

The method further comprises mixing the unfractionated hydrocarbon mixture with nitrogen to form the enhanced recovery fluid. The method further comprises mixing the unfractionated hydrocarbon mixture with carbon dioxide to form the enhanced recovery fluid. The method further comprises mixing the unfractionated hydrocarbon mixture with methane to form the enhanced recovery fluid.

The method further comprises alternating injections of the enhanced recovery fluid and nitrogen into the unconventional resource reservoir via the injection well. The method further comprises alternating injections of the enhanced recovery fluid and carbon dioxide into the unconventional resource reservoir via the injection well. The method further comprises alternating injections of the enhanced recovery fluid and methane into the unconventional resource reservoir via the injection well.

The method further comprises injecting a slug of the enhanced recovery fluid followed by a continuous slug of nitrogen into the unconventional resource reservoir via the injection well. The method further comprises injecting a slug of the enhanced recovery fluid followed by a continuous slug of carbon dioxide into the unconventional resource reservoir via the injection well. The method further comprises injecting a slug of the enhanced recovery fluid followed by a continuous slug of methane into the unconventional resource reservoir via the injection well.

The method further comprises simultaneously injecting the enhanced recovery fluid into one or more offset injection wells, shutting in the injection wells for a period of time to allow the enhanced recovery injection fluid to soak in the unconventional resource reservoir, and then producing the hydrocarbons from the unconventional resource reservoir via the injection wells.

The method further comprises mixing the unfractionated hydrocarbon mixture with a surfactant and water to create an emulsion forming the enhanced recovery fluid, shutting in the injection well for a period of time to allow the enhanced recovery fluid to soak in the unconventional resource reservoir, and the producing the hydrocarbons from the unconventional resource reservoir via the injection well.

The method further comprises mixing the unfractionated hydrocarbon mixture with a surfactant, water, and nitrogen to create a foam forming the enhanced recovery fluid, shutting in the injection well for a period of time to allow the enhanced recovery fluid to soak in the unconventional resource reservoir, then producing the hydrocarbons from the unconventional resource reservoir via the injection well.

The composition of the unfractionated hydrocarbon mixture comprises ethane, propane, and butane in an amount of at least 75% by volume of the unfractionated hydrocarbon mixture. The composition of the unfractionated hydrocarbon mixture comprises ethane in an amount of at least 3% by volume of the unfractionated hydrocarbon mixture. The composition of the unfractionated hydrocarbon mixture comprises pentane plus in an amount less than 30% by volume of the unfractionated hydrocarbon mixture.

The method further comprises injecting the enhanced recovery fluid into the unconventional resource reservoir at an injection pressure less than or equal to 10,000 pounds per square inch.

The method further comprises running a thermal decay time log, a carbon-oxygen log, or a cased-hole pulsed neutron log prior to injecting the enhanced recovery fluid into the unconventional resource reservoir and then after producing the hydrocarbons from the unconventional resource reservoir to quantitatively establish the amount of residual oil that has been mobilized, displaced, and produced.

The method further comprises mixing the unfractionated hydrocarbon mixture with a nonionic surfactant, up to ten percent water inhibited with 1 percent to 3 percent potassium chloride, and nitrogen to create a foam forming the enhanced recovery fluid.

The method further comprises producing hydrocarbons from the unconventional resource reservoir via a pair of production wells that are offset from and located on opposite sides of the injection well.

The method further comprises running an inner string into the injection well, isolating one or more sections of hydraulic fractures of the unconventional resource reservoir, and injecting the enhanced recovery fluid through the inner string and into each isolated section and the unconventional resource reservoir.

The method further comprises injecting a chemical diverting agent into the unconventional resource reservoir to temporarily blocking high volume perforation clusters formed in the injection well so that the enhanced recovery fluid is injected uniformly into the unconventional resource reservoir.

The method further comprises continuously injecting the enhanced recovery fluid into the unconventional resource reservoir via the injection well while producing the hydrocarbons from the production well.

In one embodiment, a method of enhanced oil recovery from an unconventional resource reservoir comprises injecting a gas comprising at least one of nitrogen, carbon dioxide, and methane into the unconventional resource reservoir via an injection well; and producing hydrocarbons from the unconventional resource reservoir via the injection well or a production well offset from the injection well. The injection well comprises an array of injection wells. The production well comprises an array of production wells.

The method further comprises shutting in the injection well for a period of time to allow the gas to soak in the unconventional resource reservoir, and then producing the hydrocarbons from the unconventional resource reservoir via the injection well.

The method further comprises injecting the gas into the unconventional resource reservoir at an injection pressure less than or equal to 10,000 pounds per square inch.

The method further comprises running a thermal decay time log, a carbon-oxygen log, or a cased-hole pulsed neutron log prior to injecting the gas into the unconventional resource reservoir and then after producing the hydrocarbons from the unconventional resource reservoir to quantitatively establish the amount of residual oil that has been mobilized, displaced, and produced.

The method further comprises producing hydrocarbons from the unconventional resource reservoir via a pair of production wells that are offset from and located on opposite sides of the injection well.

The method further comprises running an inner string into the injection well, isolating one or more sections of hydraulic fractures of the unconventional resource reservoir, and injecting the gas through the inner string and into each isolated section and the unconventional resource reservoir. The inner string has gas lift mandrels and gas lift valves, and further comprising injecting the gas through the gas lift mandrels and gas lift valves at each isolated section to regulate a volume of the gas that is injected into the unconventional resource reservoir at each isolated section.

The method further comprises injecting a chemical diverting agent into the unconventional resource reservoir to temporarily blocking high volume perforation clusters formed in the injection well so that the gas is injected uniformly into the unconventional resource reservoir.

The method further comprises continuously injecting the gas into the unconventional resource reservoir via the injection well while producing the hydrocarbons from the production well.

In one embodiment, a method of enhanced oil recovery from an unconventional resource reservoir comprises running an inner string into an injection well; setting a packer assembly to isolate a section of perforation clusters and hydraulic fractures formed in the unconventional resource reservoir; injecting an enhanced recovery fluid through the inner string and into the isolated section and the unconventional resource reservoir; and producing hydrocarbons from the unconventional resource reservoir via the injection well or a production well offset from the injection well. The injection well comprises an array of injection wells. The production well comprises an array of production wells.

The enhanced recovery fluid comprises an unfractionated hydrocarbon mixture into the unconventional resource reservoir via an injection well, wherein the unfractionated hydrocarbon mixture is a by-product that is condensed at a temperature at or below 0 degrees Fahrenheit of a de-methanized hydrocarbon stream and comprises a mixture of ethane, propane, normal butane, isobutane, and pentane plus.

The method further comprises mixing the unfractionated hydrocarbon mixture with a polymer to form the enhanced recovery fluid. The method further comprises mixing the unfractionated hydrocarbon mixture with a surfactant and water to create an emulsion forming the enhanced recovery fluid. The method further comprises mixing the unfractionated hydrocarbon mixture with a surfactant, water, and nitrogen to create a foam forming the enhanced recovery fluid.

The method further comprises mixing the unfractionated hydrocarbon mixture with nitrogen to form the enhanced recovery fluid. The method further comprises mixing the unfractionated hydrocarbon mixture with carbon dioxide to form the enhanced recovery fluid. The method further comprises mixing the unfractionated hydrocarbon mixture with methane to form the enhanced recovery fluid.

The composition of the unfractionated hydrocarbon mixture comprises ethane, propane, and butane in an amount of at least 75% by volume of the unfractionated hydrocarbon mixture. The composition of the unfractionated hydrocarbon mixture comprises ethane in an amount of at least 3% by volume of the unfractionated hydrocarbon mixture. The composition of the unfractionated hydrocarbon mixture comprises pentane plus in an amount less than 30% by volume of the unfractionated hydrocarbon mixture.

The method further comprises alternating injections of the enhanced recovery fluid and nitrogen through the inner string and into the isolated section and the unconventional resource reservoir. The method further comprises alternating injections of the enhanced recovery fluid and carbon dioxide through the inner string and into the isolated section and the unconventional resource reservoir. The method further comprises alternating injections of the enhanced recovery fluid and methane through the inner string and into the isolated section and the unconventional resource reservoir.

The method further comprises injecting a slug of the enhanced recovery fluid followed by a continuous slug of nitrogen through the inner string and into the isolated section and the unconventional resource reservoir. The method further comprises injecting a slug of the enhanced recovery fluid followed by a continuous slug of carbon dioxide through the inner string and into the isolated section and the unconventional resource reservoir. The method further comprises injecting a slug of the enhanced recovery fluid followed by a continuous slug of methane through the inner string and into the isolated section and the unconventional resource reservoir.

The method further comprises simultaneously injecting the enhanced recovery fluid into one or more offset injection wells, shutting in the injection wells for a period of time to allow the enhanced recovery injection fluid to soak in the unconventional resource reservoir, and then producing the hydrocarbons from the unconventional resource reservoir via the injection wells.

The method further comprises mixing an unfractionated hydrocarbon mixture with a surfactant and water to create an emulsion forming the enhanced recovery fluid, shutting in the injection well for a period of time to allow the enhanced recovery fluid to soak in the unconventional resource reservoir, and the producing the hydrocarbons from the unconventional resource reservoir via the injection well.

The method further comprises mixing an unfractionated hydrocarbon mixture with a surfactant, water, and nitrogen to create a foam forming the enhanced recovery fluid, shutting in the injection well for a period of time to allow the enhanced recovery fluid to soak in the unconventional resource reservoir, then producing the hydrocarbons from the unconventional resource reservoir via the injection well.

The method further comprises injecting the enhanced recovery fluid through the inner string and into the isolated section and the unconventional resource reservoir at an injection pressure less than or equal to 10,000 pounds per square inch.

The method further comprises running a thermal decay time log, a carbon-oxygen log, or a cased-hole pulsed neutron log prior to injecting the enhanced recovery fluid into the unconventional resource reservoir and then after producing the hydrocarbons from the unconventional resource reservoir to quantitatively establish the amount of residual oil that has been mobilized, displaced, and produced.

The method further comprises mixing an unfractionated hydrocarbon mixture with a nonionic surfactant, up to ten percent water inhibited with 1 percent to 3 percent potassium chloride, and nitrogen to create a foam forming the enhanced recovery fluid.

The method further comprises producing hydrocarbons from the unconventional resource reservoir via a pair of production wells that are offset from and located on opposite sides of the injection well.

The method further comprises isolating one or more sections of perforation clusters and hydraulic fractures, and injecting the enhanced recovery fluid through the inner string and into the isolated sections and the unconventional resource reservoir at each isolated section. The inner string comprises a gas lift mandrel and a gas lift valve positioned between each packer assembly that are configured to regulate a volume of the enhanced recovery fluid that is injected into the unconventional resource reservoir at each isolated section.

The method further comprises continuously injecting the enhanced recovery fluid through the inner string and into the isolated section and the unconventional resource reservoir while producing the hydrocarbons from the production well.

The inner string is a coiled tubing string, and wherein the packer assembly comprises a retrievable bridge plug and packer.

The enhanced recovery fluid is a gas comprising at least one of nitrogen, carbon dioxide, and methane.

The embodiments disclosed herein provide one or more of the following advantages: as Y-Grade NGL enters the unconventional resource reservoir it will begin to migrate into the hydraulic and natural fracture system and towards the offset production wells due to the lower pressure gradient as the result of pressure depletion from the withdrawal of fluids from the reservoir; as Y-Grade NGL continues to migrate through the hydraulic fractures and natural fractures of the unconventional resource reservoir it will permeate into the pore spaces, solubilize the hydrocarbons and kerogen, and expand thereby displacing additional trapped hydrocarbons held in place due to capillary forces; as Y-Grade NGL migrates through the unconventional resource reservoir it will lower the oil/gas interfacial tension and become enriched due to the evaporation of hydrocarbon intermediates (e.g. hexane's and heptane's) into the gas phase; Y-Grade, surfactant, nitrogen, and water are combined to form a stable foam that can improve mobility and conformance of hydrocarbons in the unconventional resource reservoir.

In any of the embodiments where the injection well is shut in for a period of time or extended soak cycle to allow the enhanced recovery fluid to soak in the reservoir, the well may be shut in for several weeks or months and typically less than 6 months.

Any of the embodiments (in whole or in part) described herein can be used in combination with any other embodiment (in whole or in part) described herein.

While the foregoing is directed to certain embodiments, other and further embodiments may be devised without departing from the basic scope of this disclosure.

We claim:

1. A method of enhanced oil recovery from an unconventional resource reservoir located at a wellsite, comprising:
    injecting an enhanced recovery fluid comprising an unfractionated hydrocarbon mixture into the unconventional resource reservoir via an injection well at a pressure below the unconventional resource reservoir fracture pressure, wherein the unconventional resource reservoir is a reservoir that has been previously hydraulically fractured and comprises a hydrocarbon hearing reservoir, a seal to contain hydrocarbons within the hydrocarbon bearing reservoir, and a source rock from which hydrocarbons are generated all combined in the same formation layer,
    wherein the unfractionated hydrocarbon mixture is a by-product that is condensed at a temperature at or below 0 degrees Fahrenheit of a de-methanized hydrocarbon stream and comprises a mixture of ethane, propane, normal butane, isobutane, pentane, and less than 1 percent methane by liquid volume, wherein the ethane, propane, normal butane, and isobutane comprise at least 75 percent by liquid volume of the unfractionated hydrocarbon mixture,
    wherein the unfractionated hydrocarbon mixture is sourced and transported from a separate processing facility that is located at a location remote from the welisite of the unconventional resource reservoir, wherein the separate processing facility comprises at least one of a splitter facility, a gas plant, and a refinery, and wherein the unfractionated hydrocarbon mixture is transported via truck or pipeline from the separate processing facility to the unconventional resource reservoir;

alternating injections of the enhanced recovery fluid with injections of a gas into the unconventional resource reservoir via the injection well; and producing hydrocarbons from the unconventional resource reservoir via the injection well or a production well offset from the injection well, wherein the injection well comprises an array of vertical or horizontal injection wells, and wherein the production well comprises an array of vertical or horizontal production wells offset from the array of injection wells.

2. The method of claim 1, further comprising mixing the unfractionated hydrocarbon mixture with a polymer to form the enhanced recovery fluid.

3. The method of claim 1, further comprising mixing the unfractionated hydrocarbon mixture with a surfactant and water to create an emulsion forming the enhanced recovery fluid.

4. The method of claim 1, further comprising mixing the unfractionated hydrocarbon mixture with a surfactant, water, and nitrogen to create a foam forming the enhanced recovery fluid.

5. The method of claim 1, further comprising mixing the unfractionated hydrocarbon mixture with nitrogen to form the enhanced recovery fluid.

6. The method of claim 1, wherein the gas comprises nitrogen.

7. The method of claim 1, wherein the gas comprises carbon dioxide.

8. The method of claim 1, wherein the gas comprises methane.

9. The method of claim 1, further comprising simultaneously injecting the enhanced recovery fluid into one or more offset injection wells, shutting in the injection wells for a period of time to allow the enhanced recovery injection fluid to soak in the unconventional resource reservoir, and then producing the hydrocarbons from the unconventional resource reservoir via the injection wells.

10. The method of claim 1, further comprising mixing the unfractionated hydrocarbon mixture with a surfactant and water to create an emulsion forming the enhanced recovery fluid, shutting in the injection well for a period of time to allow the enhanced recovery fluid to soak in the unconventional resource reservoir, and the producing the hydrocarbons from the unconventional resource reservoir via the injection well.

11. The method of claim 1, further comprising mixing the unfractionated hydrocarbon mixture with a surfactant, water, and nitrogen to create a foam forming the enhanced recovery fluid, shutting in the injection well for a period of time to allow the enhanced recovery fluid to soak in the unconventional resource reservoir, then producing the hydrocarbons from the unconventional resource reservoir via the injection well.

12. The method of claim 1, wherein the composition of the unfractionated hydrocarbon mixture comprises ethane in an amount of at least 1 mole percent of the unfractionated hydrocarbon mixture.

13. The method of claim 1, wherein the composition of the unfractionated hydrocarbon mixture comprises pentane in an amount less than 30% by volume of the unfractionated hydrocarbon mixture.

14. The method of claim 1, further comprising injecting the enhanced recovery fluid into the unconventional resource reservoir at an injection pressure less than or equal to 10,000 pounds per square inch.

15. The method of claim 1, further comprising running a thermal decay time log, a carbon-oxygen log, or a cased-hole pulsed neutron log prior to injecting the enhanced recovery fluid into the unconventional resource reservoir and then after producing the hydrocarbons from the unconventional resource reservoir to quantitatively establish the amount of residual oil that has been mobilized, displaced, and produced.

16. The method of claim 1, further comprising producing hydrocarbons from the unconventional resource reservoir via a pair of production wells that are offset from and located on opposite sides of the injection well.

17. The method of claim 1, further comprising running an inner string into the injection well, isolating one or more sections of hydraulic fractures of the unconventional resource reservoir, and injecting the enhanced recovery fluid through the inner string and into each isolated section and the unconventional resource reservoir.

18. The method of claim 1, further comprising injecting a chemical diverting agent into the unconventional resource reservoir to temporarily blocking high volume perforation clusters formed in the injection well so that the enhanced recovery fluid is injected uniformly into the unconventional resource reservoir.

19. The method of claim 1, further comprising continuously injecting the enhanced recovery fluid into the unconventional resource reservoir via the injection well while producing the hydrocarbons from the production well.

20. A method of enhanced oil recovery from an unconventional resource reservoir located at a wellsite, comprising:

running an inner string into an injection well;

setting a packer assembly to isolate a section of perforation clusters and hydraulic fractures formed in the unconventional resource reservoir, wherein the unconventional resource reservoir is a reservoir that has been previously hydraulically fractured and comprises a hydrocarbon bearing reservoir, a seal to contain hydrocarbons within the hydrocarbon bearing reservoir, and a source rock from which hydrocarbons are generated all combined in the same formation layer;

injecting an enhanced recovery fluid comprising an unfractionated hydrocarbon mixture through the inner string and into the isolated section and the unconventional resource reservoir at a pressure below the unconventional resource reservoir fracture pressure, wherein the unfractionated hydrocarbon mixture is a by-product that is condensed at a temperature at or below 0 degrees Fahrenheit of a de-methanized hydrocarbon stream and comprises a mixture of ethane, propane, normal butane, isobutane, pentane, and less than 1 percent methane by liquid volume, wherein the ethane, propane, normal butane, and isobutane comprise at least 75 percent by liquid volume of the unfractionated hydrocarbon mixture, wherein the unfractionated hydrocarbon mixture is sourced and transported from a separate processing facility that is located at a location remote from the wellsite of the unconventional resource reservoir, wherein the separate processing facility comprises at least one of a splitter facility, a gas plant, and a refinery, and wherein the unfractionated hydrocarbon mixture is transported via truck or pipeline from the separate processing facility to the unconventional resource reservoir;

alternating injections of the enhanced recovery fluid with injections of a gas into the unconventional resource reservoir via the injection well; and producing hydrocarbons from the unconventional resource reservoir via the injection well or a production well offset from the injection well, wherein the injection well comprises an array of vertical or horizontal injection wells, and Wherein the production well comprises an array of vertical or horizontal production wells offset from the array of injection wells.

21. The method of claim 20, further comprising mixing the unfractionated hydrocarbon mixture with a polymer to form the enhanced recovery fluid.

22. The method of claim 20, further comprising mixing the unfractionated hydrocarbon mixture with a surfactant and water to create an emulsion forming the enhanced recovery fluid.

23. The method of claim 20, further comprising mixing the unfractionated hydrocarbon mixture with a surfactant, water, and nitrogen to create a foam forming the enhanced recovery fluid.

24. The method of claim 20, further comprising mixing the unfractionated hydrocarbon mixture with nitrogen to form the enhanced recovery fluid.

25. The method of claim 20, wherein the composition of the unfractionated hydrocarbon mixture comprises ethane in an amount of at least 3% by volume of the unfractionated hydrocarbon mixture.

26. The method of claim 20, wherein the composition of the unfractionated hydrocarbon mixture comprises pentane in an amount less than 30% by volume of the unfractionated hydrocarbon mixture.

27. The method of claim 20, wherein the gas comprises nitrogen.

28. The method of claim 20, wherein the gas comprises carbon dioxide.

29. The method of claim 20, wherein the gas comprises methane.

30. The method of claim 20, further comprising simultaneously injecting the enhanced recovery fluid into one or more offset injection wells, shutting in the injection wells for a period of time to allow the enhanced recovery injection fluid to soak in the unconventional resource reservoir, and then producing the hydrocarbons from the unconventional resource reservoir via the injection wells.

31. The method of claim 20, further comprising mixing an unfractionated hydrocarbon mixture with a surfactant and water to create an emulsion forming the enhanced recovery fluid, shutting in the injection well for a period of time to allow the enhanced recovery fluid to soak in the unconventional resource reservoir, and the producing the hydrocarbons from the unconventional resource reservoir via the injection well.

32. The method of claim 20, further comprising mixing an unfractionated hydrocarbon mixture with a surfactant, water, and nitrogen to create a foam forming the enhanced recovery fluid, shutting in the injection well for a period of time to allow the enhanced recovery fluid to soak in the unconventional resource reservoir, then producing the hydrocarbons from the unconventional resource reservoir via the injection well.

33. The method of claim 20, further comprising injecting the enhanced recovery fluid through the inner string and into the isolated section and the unconventional resource reservoir at an injection pressure less than or equal to 10,000 pounds per square inch.

34. The method of claim 20, further comprising running a thermal decay time log, a carbon-oxygen log, or a cased-hole pulsed neutron log prior to injecting the enhanced recovery fluid into the unconventional resource reservoir and then after producing the hydrocarbons from the unconventional resource reservoir to quantitatively establish the amount of residual oil that has been mobilized, displaced, and produced.

35. The method of claim 20, further comprising producing hydrocarbons from the unconventional resource reservoir via a pair of production wells that are offset from and located on opposite sides of the injection well.

36. The method of claim 20, further comprising isolating one or more sections of perforation clusters and hydraulic fractures, and injecting the enhanced recovery fluid through the inner string and into the isolated sections and the unconventional resource reservoir at each isolated section.

37. The method of claim 36, wherein the inner string comprises a gas lift mandrel and a gas lift valve positioned between each packer assembly that are configured to regulate a volume of the enhanced recovery fluid that is injected into the unconventional resource reservoir at each isolated section.

38. The method of claim 20, further comprising continuously injecting the enhanced recovery fluid through the inner string and into the isolated section and the unconventional resource reservoir while producing the hydrocarbons from the production well.

39. The method of claim 20, wherein the inner string is a coiled tubing string, and wherein the packer assembly comprises a retrievable bridge plug and packer.

* * * * *